United States Patent
Ma et al.

(10) Patent No.: US 12,192,616 B2
(45) Date of Patent: Jan. 7, 2025

(54) PHOTOGRAPHING METHOD AND APPARATUS

(71) Applicant: HUAWEI TECHNOLOGIES CO., LTD., Guangdong (CN)

(72) Inventors: Feilong Ma, Beijing (CN); Cong Zhao, Beijing (CN); Rui Chen, Shenzhen (CN); Yuanqiang Wang, Shenzhen (CN); Yu Li, Shenzhen (CN); Xingguang Song, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 18/184,773

(22) Filed: Mar. 16, 2023

(65) Prior Publication Data

US 2023/0224574 A1 Jul. 13, 2023

Related U.S. Application Data

(63) Continuation of application No. PCT/CN2021/103777, filed on Jun. 30, 2021.

(30) Foreign Application Priority Data

Sep. 17, 2020 (CN) .......................... 202010981549.9

(51) Int. Cl.
*H04N 23/63* (2023.01)
*G06T 7/194* (2017.01)
(Continued)

(52) U.S. Cl.
CPC ........... *H04N 23/632* (2023.01); *G06T 7/194* (2017.01); *G06T 7/70* (2017.01); *H04N 5/265* (2013.01);
(Continued)

(58) Field of Classification Search
CPC ...... H04N 23/667; H04N 23/64; H04N 23/61; H04N 23/632; H04N 23/63; H04N 5/272;
(Continued)

(56) References Cited

U.S. PATENT DOCUMENTS 7,623,733 B2 * 11/2009 Hirosawa ............... H04N 5/272
348/222.1
7,652,693 B2 * 1/2010 Miyashita .............. H04N 23/63
348/239
(Continued)

*Primary Examiner* — Pritham D Prabhakher

(57) ABSTRACT

The present disclosure discloses a photographing method and an apparatus in, relates to the photographing field and the field of image processing technologies. When multiple people take a group photo, no help from a third party is required. Therefore, implementation is convenient, and user satisfaction with a group photo result can be improved, thereby improving user experience. The method includes: obtaining a first image including an image of a first photographing background and a first to-be-photographed subject; then displaying a first preview interface, the first preview image includes an image of a second photographing background and an image of a second to-be-photographed subject, and a degree of coincidence between the image of the second photographing background and the image of the first photographing background is greater than or equal to a preset degree of coincidence; obtaining a target image based on the first image and the first preview image.

20 Claims, 18 Drawing Sheets

(51) Int. Cl.
*G06T 7/70* (2017.01)
*H04N 5/265* (2006.01)
*H04N 23/60* (2023.01)

(52) U.S. Cl.
CPC ... *H04N 23/64* (2023.01); *G06T 2207/20021* (2013.01); *G06T 2207/30196* (2013.01)

(58) Field of Classification Search
CPC ...... H04N 5/265; H04N 5/2226; G06T 7/194; G06T 7/70; G06T 2207/20021; G06T 2207/30196
USPC ...................................................... 348/222.1
See application file for complete search history.

(56) References Cited

U.S. PATENT DOCUMENTS

| | | | | |
|---|---|---|---|---|
| 7,855,737 B2* | 12/2010 | Petrescu | ................ | H04N 5/262 |
| | | | | 348/333.12 |
| 7,991,285 B2* | 8/2011 | Tan | ................ | G03B 15/00 |
| | | | | 348/239 |
| 8,243,182 B2* | 8/2012 | Petrescu | ................ | H04N 23/611 |
| | | | | 348/333.12 |
| 9,357,117 B2* | 5/2016 | Woo | ................ | H04N 23/951 |
| 9,479,693 B2* | 10/2016 | Kang | ................ | H04N 23/635 |
| 9,953,220 B2* | 4/2018 | Agarwal | ................ | G06T 11/60 |
| 10,021,431 B2* | 7/2018 | Tan | ................ | H04N 21/42684 |
| 10,032,068 B2* | 7/2018 | Petrescu | ................ | G06V 40/165 |
| 10,917,552 B2* | 2/2021 | Jin | ................ | G06F 3/011 |
| 2009/0175609 A1* | 7/2009 | Tan | ................ | G03B 15/00 |
| | | | | 396/77 |
| 2009/0244296 A1* | 10/2009 | Petrescu | ................ | H04N 23/63 |
| | | | | 348/E5.025 |
| 2011/0053654 A1* | 3/2011 | Petrescu | ................ | H04N 23/611 |
| | | | | 455/566 |
| 2012/0092529 A1* | 4/2012 | Choi | ................ | H04N 23/611 |
| | | | | 348/239 |
| 2012/0268552 A1* | 10/2012 | Choi | ................ | H04N 23/63 |
| | | | | 382/284 |
| 2014/0184841 A1* | 7/2014 | Woo | ................ | H04N 23/57 |
| | | | | 348/218.1 |
| 2014/0232906 A1* | 8/2014 | Ha | ................ | H04N 23/45 |
| | | | | 348/239 |
| 2019/0355172 A1* | 11/2019 | Dsouza | ................ | G06F 3/017 |

\* cited by examiner

First image

Figure a: Target photographing template

Figure b: Instance segmentation result

Figure a: Target photographing template

Figure b: Depth image

Figure c: Instance segmentation result

Figure a: Target photographing template    Figure b: Instance segmentation result Target photographing template

PHOTOGRAPHING METHOD AND APPARATUS

CROSS-REFERENCE TO RELATED APPLICATIONS

This application is a continuation of International Application No. PCT/CN2021/103777, filed on Jun. 30, 2021, which claims priority to Chinese Patent Application No. 202010981549.9, filed on Sep. 17, 2020. The disclosures of the aforementioned applications are hereby incorporated by reference in their entireties.

TECHNICAL FIELD

The present disclosure relates to the photographing field and the field of image processing technologies, and in particular, to a photographing method and a photographing apparatus.

BACKGROUND

In a scenario that multiple people take a group photo (for example, multiple people, such as a couple, besties, a parent and child, a family, or a group, take a group photo), currently, a third party (for example, a passerby) is usually required to help take a photo. In most cases, it is difficult to find a third party who is willing to provide help. Even if the third party willing to provide help is found, it is difficult to ensure that a photographed image achieves a satisfactory effect. Therefore, how to resolve the foregoing requirement for taking a group photo of multiple people becomes an urgent technical problem to be resolved.

SUMMARY

Embodiments of the present disclosure provide a photographing method and an apparatus. When multiple people take a group photo, no help from a third party is required. Therefore, implementation is convenient, and user satisfaction with a group photo result can be improved, thereby improving user experience.

To achieve the foregoing objective, the present disclosure uses the following technical solutions.

According to a first aspect, a photographing method is provided. The photographing method is applied to a terminal to photograph a plurality of to-be-photographed subjects. The plurality of to-be-photographed subjects include a first to-be-photographed subject and a second to-be-photographed subject. The method includes: obtaining a first image, where the first image includes an image of a first photographing background and an image of the first to-be-photographed subject: displaying a first preview interface, where the first preview interface includes a first preview image, the first preview image includes an image of a second photographing background and an image of the second to-be-photographed subject, and a degree of coincidence between the image of the second photographing background and the image of the first photographing background is greater than or equal to a preset degree of coincidence; and obtaining a target image based on the first image and the first preview image, where the target image includes the image of the first to-be-photographed subject and the image of the second to-be-photographed subject.

In the technical solutions, when a user needs to take a group photo of a plurality of to-be-photographed subjects, the terminal uses a part of the to-be-photographed subjects as a first to-be-photographed subject to obtain one frame of image, and uses the other part of the to-be-photographed subjects as a second to-be-photographed subject to obtain another frame of image through photographing. Then, based on the two frames of images, a target image including an image of the first to-be-photographed subject and an image of the second to-be-photographed subject is obtained, thereby achieving a group photo of the plurality of to-be-photographed subjects. Compared with the conventional technology, no help from the third party (for example, a passerby) is required, and therefore the implementation is convenient. In addition, compared with a technical solution with help of the third party, the technical solutions provided in embodiments of the present disclosure can further improve the user satisfaction with the group photo result (that is, the target image), thereby improving user experience.

In a possible design, before the displaying a first preview interface, the method further includes: displaying a second preview interface, where the second preview interface includes a second preview image and first information. The second preview image includes an image of a third photographing background and the image of the second to-be-photographed subject, and the first information indicates adjusting an image of a photographing background in a current preview image of the terminal. In this way, a degree of coincidence between an image of a photographing background of a current preview interface and the image of the first photographing background is improved, thereby improving a fusion effect and user satisfaction with the target image.

In a possible design, the first information specifically indicates at least one of the following: a degree of coincidence between the image of the third photographing background and the image of the first photographing background is less than the preset degree of coincidence: or a target position of the terminal.

In a possible design, the first preview interface further includes second information. The second information indicates at least one of a position, a pose, or a size of the image of the first to-be-photographed subject in the image of the second photographing background. This helps a user who takes a photograph guide the second to-be-photographed subject in at least one of a position, a pose, or a size of the second to-be-photographed subject in the second photographing background, thereby improving a user experience effect and enhancing the user satisfaction with the target image.

In a possible design, the second information specifically includes a contour of the image of the first to-be-photographed subject or a translucent image of the image of the first to-be-photographed subject.

In a possible design, the obtaining a first image includes: outputting third information, where the third information indicates that the second to-be-photographed subject is a user who photographs the first image: displaying a third preview image after outputting the third information, where the third preview image includes the image of the first photographing background and the image of the first to-be-photographed subject; and determining the third preview image as the first image, or determining, as the first image, an image obtained by processing the third preview image. The terminal actively recommends, to a user, the user who photographs a first image. This helps improve user experience. In addition, when a recommendation rule used by the terminal is proper, this helps improve a fusion effect of the first image and the first preview image, thereby improving the user satisfaction.

In a possible design, the outputting third information includes: displaying a target photographing template, where the target photographing template indicates the third information and a position relationship between the plurality of to-be-photographed subjects. In this way, after determining to display the target photographing template, the terminal does not need to separately determine and display the third information, thereby saving computing resources of the terminal.

In a possible design, the method further includes: displaying a target photographing template, where the target photographing template indicates a position relationship between the plurality of to-be-photographed subjects. In this case, the outputting third information includes: outputting the third information based on the target photographing template. The target photographing template is selected from a plurality of photographing templates in a photographing template library. The photographing template library may reuse a photographing template library in any conventional technology. Therefore, this technical solution is applicable in a wide range.

In a possible design, the outputting third information based on the target photographing template includes: receiving a first operation, where the first operation is used to select a user in the target photographing template who photographs the first image; and outputting the third information in response to the first operation. The terminal determines, through human-computer interaction, the user who photographs the first image, which helps improve a sense of participation of the user and enhance user experience.

In a possible design, the target photographing template further indicates poses of the plurality of to-be-photographed subjects.

In a possible design, the user who photographs the first image is a to-be-photographed subject whose range of coincidence with another to-be-photographed subject is less than or equal to a preset range of coincidence in the plurality of to-be-photographed subjects. This helps improve a fusion effect of the target image, thereby improving the user satisfaction with the target image.

In a possible design, the user who photographs the first image is a to-be-photographed subject closest to the terminal in the plurality of to-be-photographed subjects. This helps improve the fusion effect of the target image, thereby improving the user satisfaction with the target image.

In a possible design, the user who photographs the first image is a to-be-photographed subject whose distance from another to-be-photographed subject is greater than a preset distance in the plurality of to-be-photographed subjects. This helps improve the fusion effect of the target image, thereby improving the user satisfaction with the target image.

In a possible design, the obtaining a target image based on the first image and the first preview image includes: performing image segmentation on the first image based on the image of the second photographing background to obtain the image of the first to-be-photographed subject; and obtaining the target image based on the image of the first to-be-photographed subject and the first preview image. In this way, the terminal may more accurately learn, with reference to a coincidence relationship between the second photographing background and the first photographing background, whether a pixel is a pixel in the image of the first photographing background or a pixel in the image of the first to-be-photographed subject, thereby improving accuracy of extracting the first to-be-photographed subject, and further improving an image fusion effect.

In a possible design, image segmentation is performed on the first preview image based on the image of the first photographing background to obtain the image of the second to-be-photographed subject; and the target image is obtained based on the image of the second to-be-photographed subject and the first preview image. In this way, the terminal may more accurately learn, with reference to the coincidence relationship between the second photographing background and the first photographing background, whether a pixel is a pixel in the image of the second photographing background or a pixel in the image of the second to-be-photographed subject, thereby improving accuracy of extracting the second to-be-photographed subject, and further improving the image fusion effect.

According to a second aspect, a terminal is provided.

In a possible design, the terminal may be configured to perform any method provided in the foregoing first aspect. In the present disclosure, functional module division may be performed on the terminal according to any method provided in the foregoing first aspect and any possible design manner of the first aspect. For example, each functional module may be obtained through division based on a corresponding function, or two or more functions may be integrated into one processing module. For example, in the present disclosure, the terminal may be divided into a processing unit, a display unit, and the like based on functions. For descriptions of possible technical solutions performed by the foregoing functional modules obtained through division and beneficial effects, refer to the technical solutions provided in the first aspect or corresponding possible designs of the first aspect.

In another possible design, the terminal includes a memory and a processor. The memory is configured to store a computer instruction, and the processor is configured to invoke the computer instruction, to perform any method provided in the first aspect and any possible design manner of the first aspect. A display step in any method provided in the first aspect and any possible design manner of the first aspect may be specifically replaced with a display control step in the possible design. An output step in any method provided in the first aspect or any possible design manner may be specifically replaced with an output control step in the possible design.

According to a third aspect, a terminal is provided, including: a processor, a memory, and a display. The display is configured to display information such as an image. The memory is configured to store a computer program and an instruction. The processor is configured to invoke the computer program and the instruction, and perform the technical solutions provided in the first aspect or the corresponding possible designs of the first aspect in collaboration with the display.

According to a fourth aspect, a computer-readable storage medium is provided, for example, a non-transitory computer-readable storage medium. The computer-readable storage medium stores a computer program (or an instruction). When the computer program (or the instruction) is run on a computer, the computer is enabled to perform any method provided in any one of the possible implementations according to the first aspect. A display step in any method provided in the first aspect and any possible design manner of the first aspect may be specifically replaced with a display control step in the possible design. An output step in any method provided in the first aspect or any possible design manner may be specifically replaced with an output control step in the possible design.

According to a fifth aspect, a computer program product is provided. When the computer program product is run on a computer, any method provided in any one of the possible implementations according to the first aspect or the second aspect is performed. A display step in any method provided in the first aspect and any possible design manner of the first aspect may be specifically replaced with a display control step in the possible design. An output step in any method provided in the first aspect or any possible design manner may be specifically replaced with an output control step in the possible design.

It may be understood that any one of the terminal, the computer storage medium, the computer program product, a chip system, or the like provided above may be applied to a corresponding method provided above. Therefore, for beneficial effects that can be achieved by the terminal, the computer storage medium, the computer program product, the chip system, or the like, refer to the beneficial effects of the corresponding method.

In the present disclosure, a name of the image processing apparatus or each functional module does not constitute a limitation on devices or functional modules. During actual implementation, these devices or functional modules may have other names. Each device or functional module falls within the scope defined by the claims and their equivalent technologies in the present disclosure, provided that a function of the device or functional module is similar to that described in the present disclosure.

These aspects or other aspects in the present disclosure are clearer and easier to understand in the following descriptions.

DESCRIPTION OF EMBODIMENTS

In embodiments of the present disclosure, the term "example", "for example", or the like, is used to represent giving an example, an illustration, or a description. Any embodiment or design scheme described as an "example" or "for example" in embodiments of the present disclosure should not be explained as being more preferred or having more advantages than another embodiment or design scheme. Exactly, use of the term "example", "for example", or the like is intended to present a related concept in a specific manner.

Terms "first" and "second" in embodiments of the present disclosure are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of the present disclosure, unless otherwise specified, "a plurality of" means two or more than two.

A photographing method provided in embodiments of the present disclosure may be applied to a terminal. The terminal may be a terminal with a camera, such as a smartphone, a tablet computer, a wearable device, or an AR/VR device, or may be a device, such as a personal computer (PC), a personal digital assistant (PDA), or a netbook, or may be any other terminal that can implement embodiments of the present disclosure. A specific form of the terminal is not limited in the present disclosure.

Figure 1:
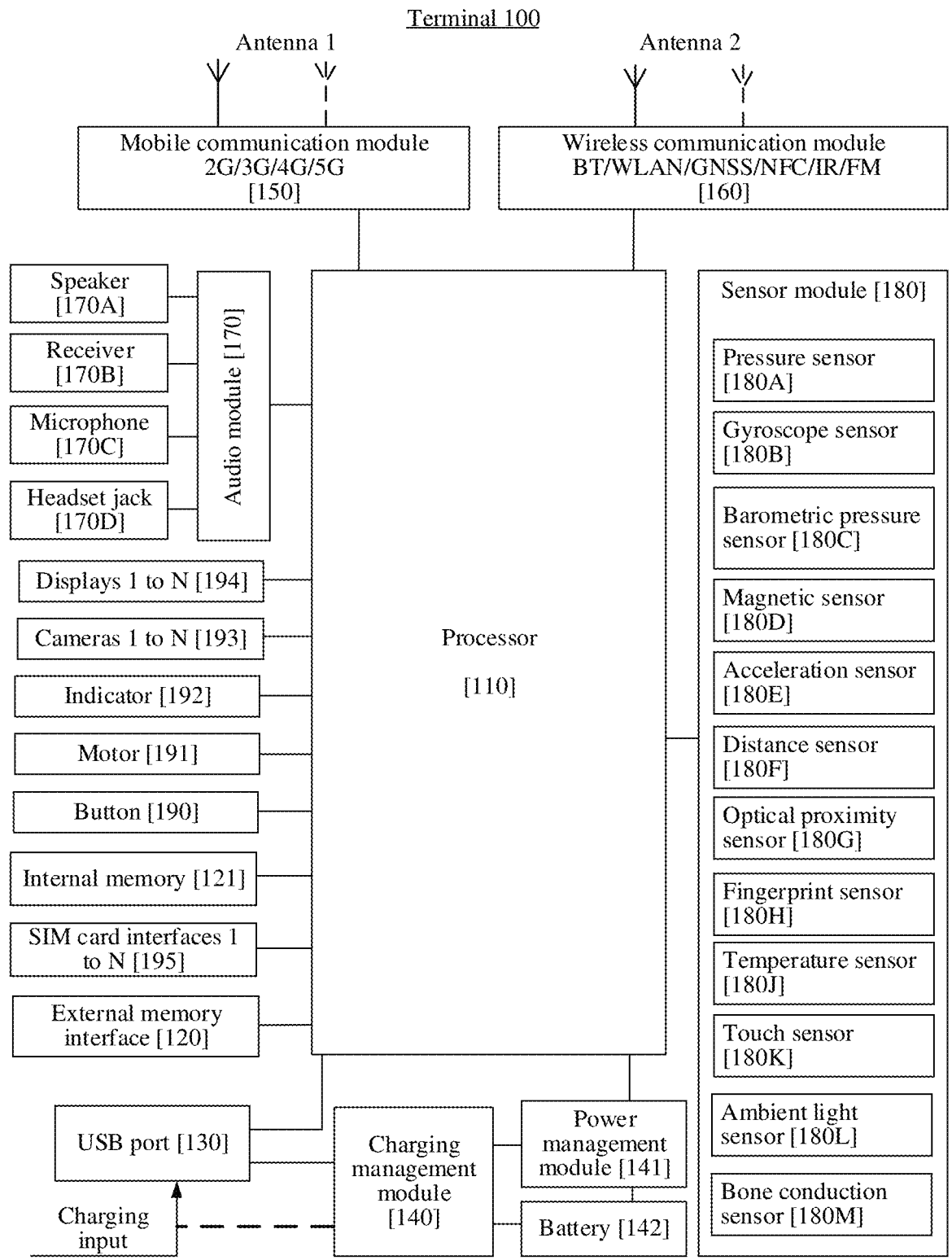
FIG. 1 is a schematic diagram of a hardware structure of a terminal to which an embodiment of the present disclosure is applicable.

In the present disclosure, a structure of the terminal may be shown in FIG. 1. As shown in FIG. 1, the terminal 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment does not constitute a specific limitation on the terminal 100. In some other embodiments, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. For example, in the present disclosure, the processor 110 may control the display 194 to display a preview interface (for example, a first preview interface or a second preview interface), a target photographing template, second information/third information, or the like. For related descriptions, refer to the following descriptions. The processor 110 is further configured to perform a fusion step, a registration step, a portrait segmentation step, or the like. For related descriptions, refer to the following descriptions.

The controller may be a nerve center and a command center of the terminal 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB type-C port, or the like. The USB port 130 may be configured to connect to a charger to charge the terminal 100, or may be configured to transmit data between the terminal 100 and a peripheral device, or may be configured to connect to a headset for playing audio through the headset. The interface may be further configured to connect to another terminal, for example, an AR device.

It may be understood that an interface connection relationship between the modules that is shown in this embodiment is merely an example for description, and does not constitute a limitation on the structure of the terminal 100. In some other embodiments of the present disclosure, the terminal 100 may alternatively use an interface connection manner different from that in the foregoing embodiment, or a combination of a plurality of interface connection manners.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may be alternatively disposed in a same component.

A wireless communication function of the terminal 100 may be implemented through the antenna 1, the antenna 2, the mobile communication module 150, the wireless communication module 160, the modem processor, the baseband processor, and the like.

The terminal 100 may implement a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal 100 may include one or N displays 194, where N is a positive integer greater than 1.

A series of graphical user interfaces (GUI) may be displayed on the display 194 of the terminal 100. These GUIs are all home screens of the terminal 100. Generally, a size of the display 194 of the terminal 100 is fixed, and limited controls can be displayed only on the display 194 of the terminal 100. The control is a GUI element, and is a software component, which is included in an application and controls all data processed by the application and interaction operations related to the data. A user may interact with the control through direct manipulation, to read or edit related information of the application. Generally, controls may include visual interface elements such as an icon, a button, a menu, a tab, a text box, a dialog box, a status bar, a navigation bar, and a widget.

The terminal 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1. For example, the camera 193 may include one or at least two cameras such as a primary camera, a long-focus camera, a wide-angle camera, an infrared camera, a depth camera, or a black-and-white camera. With reference to the technical solutions provided in embodiments of the present disclosure, the terminal may collect images (for example, the first image and the first preview image) by using the foregoing one or at least two cameras, and fuse the collected images, and the like.

The digital signal processor is configured to process a digital signal, and may process another digital signal in addition to the digital image signal. For example, when the terminal 100 selects a frequency, the digital signal processor is configured to perform Fourier transformation on frequency energy.

The video codec is configured to compress or decompress a digital video. The terminal 100 may support one or more types of video codecs. In this way, the terminal 100 may play or record videos in a plurality of coding formats, for example, moving picture experts group (MPEG) 1, MPEG 2, MPEG 3, and MPEG 4.

The NPU is a neural-network (NN) computing processor, quickly processes input information by referring to a structure of a biological neural network, for example, by referring to a mode of transfer between human brain neurons, and may further continuously perform self-learning. Applications such as intelligent cognition of the terminal 100 may be implemented through the NPU, for example, image recognition, facial recognition, speech recognition, and text understanding.

The external memory interface 120 may be used to connect to an external memory card, for example, a micro SD card, to extend a storage capability of the terminal 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications and data processing of the terminal 100. For example, in this embodiment, the processor 110 may obtain a posture of the terminal 100 by executing the instructions stored in the internal memory 121. The internal memory 121 may include a program storage area and a data storage area. The program storage area may store an operating system, an application required by at least one function (for example, a voice playing function or an image playing function), and the like. The data storage area may store data (for example, audio data and a phone book) and the like created when the terminal 100 is used. In addition, the internal memory 121 may include a high-speed random access memory, or may include a nonvolatile memory, for example, at least one magnetic disk storage device, a flash memory, or a universal flash storage (UFS). The processor 110 runs the instructions stored in the internal memory 121 and/or instructions stored in the memory disposed in the processor, to perform various function applications and data processing of the terminal 100.

The terminal 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal 100 may be used to listen to music or answer a call in a hands-free mode over the speaker 170A.

The receiver 170B, also referred to as an "earpiece", is configured to convert an audio electrical signal into a sound signal. When a call is answered or speech information is received through the terminal 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be the USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a change in the capacitance. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the terminal 100. In some embodiments, an angular velocity of the terminal 100 around three axes (namely, axes x, y, and z) may be determined by using the gyroscope sensor 180B. The gyroscope sensor 180B may be configured to implement image stabilization during photographing. For example, when a shutter is pressed, the gyroscope sensor 180B detects an angle at which the terminal 100 jitters, calculates, based on the angle, a distance for which a lens module needs to compensate, and allows a lens to cancel the jitter of the terminal 100 through reverse motion, to implement the image stabilization. The gyroscope sensor 180B may also be used in a navigation scenario and a somatic game scenario.

The barometric pressure sensor 180C is configured to measure barometric pressure. In some embodiments, the terminal 100 calculates an altitude based on a barometric pressure value measured by the barometric pressure sensor 180C, to assist in positioning and navigation.

The magnetic sensor 180D includes a Hall sensor. The terminal 100 may detect opening and closing of a flip cover by using the magnetic sensor 180D. In some embodiments, when the terminal 100 is a clamshell phone, the terminal 100 may detect opening and closing of a flip cover by using the magnetic sensor 180D. Further, a feature such as automatic unlocking of the flip cover is set based on a detected opening or closing state of the flip cover or a detected opening or closing state of the flip cover.

The acceleration sensor 180E may detect magnitudes of accelerations of the terminal 100 in various directions (usually on three axes). A magnitude and a direction of gravity may be detected when the terminal 100 is still. The acceleration sensor 180E may be further configured to identify a posture of the terminal, and is applied to an application such as switching between a landscape mode and a portrait mode or a pedometer.

The distance sensor 180F is configured to measure a distance. The terminal 100 may measure a distance in an infrared manner or a laser manner. In some embodiments, in a photographing scenario, the terminal 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The terminal 100 transmits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption for thermal protection. In some other embodiments, when the temperature is lower than another threshold, the terminal 100 heats the battery 142 to avoid abnormal shutdown of the terminal 100 due to a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different regions of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

In addition, an operating system runs above the foregoing components, for example, an iOS operating system developed by Apple, an Android open-source operating system developed by Google, and a Windows operating system developed by Microsoft. An application may be installed and run on the operating system.

An operating system of the terminal 100 may use a hierarchical architecture, an event-driven architecture, a microkernel architecture, a microservice architecture, or a cloud architecture. In embodiments of the present disclosure, an Android system with a hierarchical architecture is used as an example to describe a software structure of the terminal 100.

Figure 2:
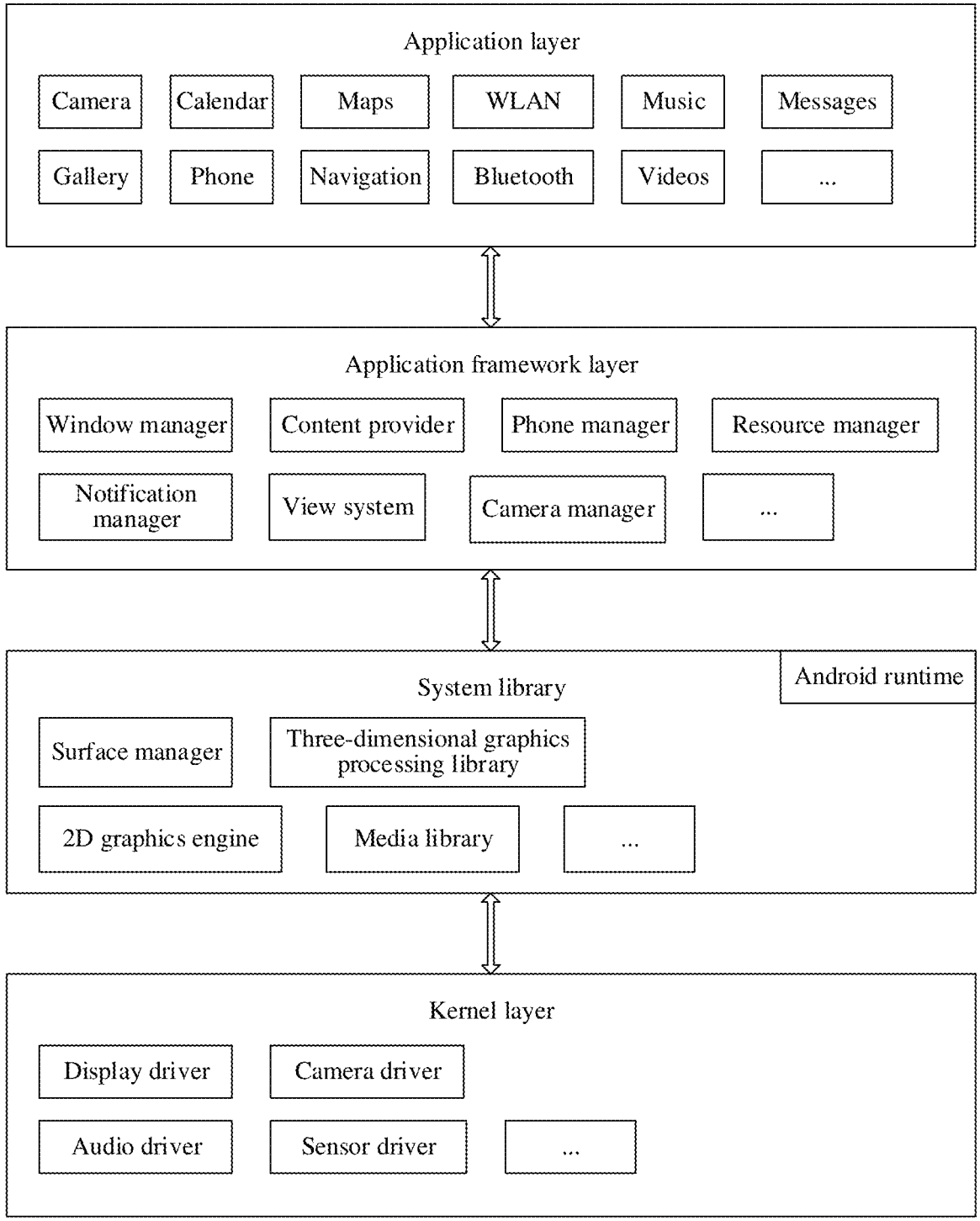
FIG. 2 is a block diagram of a software structure of a terminal to which an embodiment of the present disclosure is applicable.

FIG. 2 is a block diagram of a software structure of the terminal 100 according to an embodiment of the present disclosure.

In a hierarchical architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages. As shown in FIG. 2, the application packages may include applications such as Camera, Gallery, Calendar, Phone, Maps, Navigation, WLAN, Bluetooth, Music, Videos, and Messages. For example, during photographing, the camera application may access a camera interface management service provided by the application framework layer.

The application framework layer provides an application programming interface (API) and a programming framework for an application at the application layer. The application framework layer includes some predefined functions. As shown in FIG. 2, the application framework layer may include a window manager, a content provider, a view system, a phone manager, a resource manager, a notification manager, and the like. For example, in this embodiment of the present disclosure, during photographing, the application framework layer may provide an API related to a photographing function for the application layer, and provide a camera interface management service for the application layer, to implement the photographing function.

The window manager is configured to manage a window program. The window manager may obtain a size of the display, determine whether there is a status bar, perform screen locking, take a screenshot, and the like.

The content provider is configured to store and obtain data, and enable the data to be accessed by an application program. The data may include a video, an image, audio, calls that are made or answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function for the terminal 100, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, an alert sound is played, the terminal vibrates, and the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be noted that, although this embodiment of the present disclosure is described by using the Android system as an example, a basic principle in this embodiment is also applicable to a terminal based on an operating system such as iOS or Windows.

The following describes working processes of software and hardware of the terminal 100 by using an example with reference to FIG. 1 and a photographing scenario.

The touch sensor 180K receives the touch operation, and reports the touch operation to the processor 110, so that the processor 110 starts a camera application in response to the touch operation, and displays a user interface of the camera application on the display 194. For example, after receiving a touch operation on the camera application icon, the touch sensor 180K reports the touch operation on the camera application to the processor 110, so that, in response to the touch operation, the processor 110 starts the camera application, and displays the user interface of the camera on the display 194. In addition, in this embodiment of the present disclosure, the terminal 100 may alternatively start the camera application in another manner, and display the user interface of the camera application on the display 194. For example, when a user interface is displayed after a black screen or unlocking or a lock screen is displayed, in response to a voice instruction or a shortcut operation of the user, the terminal 100 may start the camera application, and display the user interface of the camera application on the display 194.

In a multi-person photographing scenario, how a terminal performs photographing and image processing becomes an urgent technical problem to be resolved.

Therefore, an embodiment of the present disclosure provides a photographing method, applied to taking a group photo of multiple people.

The following describes the implementations of embodiments of the present disclosure in detail with reference to accompanying drawings.

Figure 3:
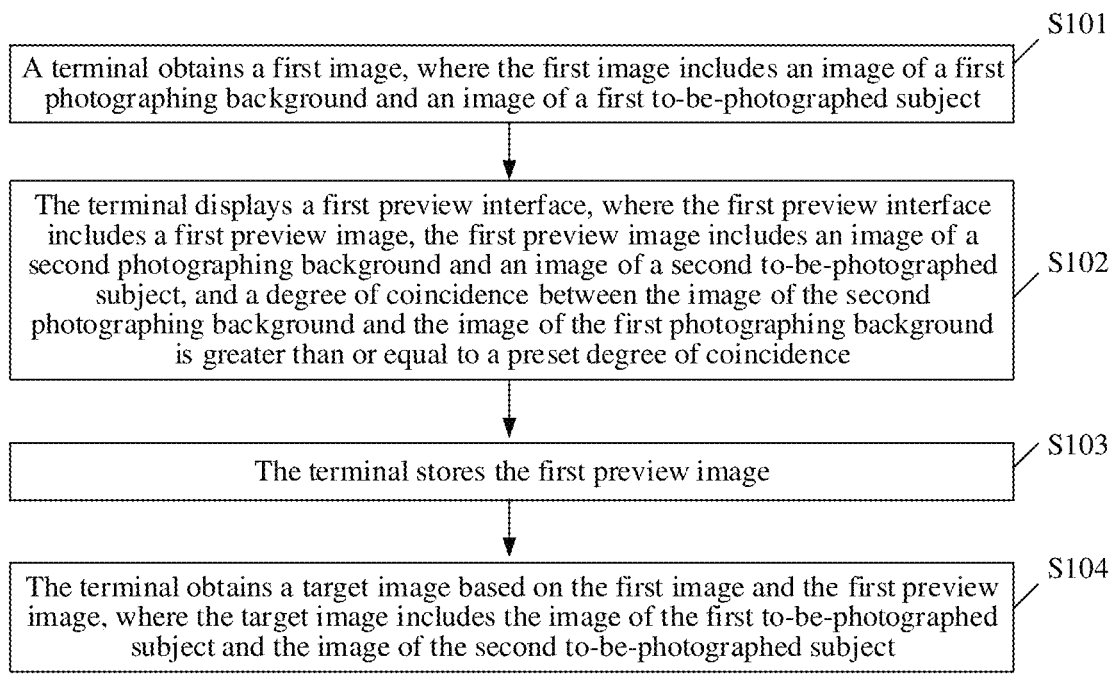
FIG. 3 is a flowchart of a photographing method according to an embodiment of the present disclosure.

FIG. 3 is a flowchart of a photographing method according to an embodiment of the present disclosure. The method shown in FIG. 3 is applied to a terminal to photograph a plurality of to-be-photographed subjects. The plurality of to-be-photographed subjects include a first to-be-photographed subject and a second to-be-photographed subject. The method includes the following steps.

S101: A terminal obtains a first image, where the first image includes an image of a first photographing background and an image of the first to-be-photographed subject.

A manner of obtaining the first image is not limited in this embodiment.

For example, the first image may be a frame of image obtained by the terminal in non-real time, or a frame of image obtained by the terminal in real time.

For another example, the first image may be a frame of image locally generated by the terminal. For example, the first image is an image stored in the terminal and collected by a camera of the terminal, or an image stored in the terminal and obtained by processing (for example, one or more of image cropping, image zooming, or image fusion) the image collected by the camera of the terminal. Alternatively, the first image is a received frame of image sent by another device (for example, another terminal or a network device).

Figure 4:
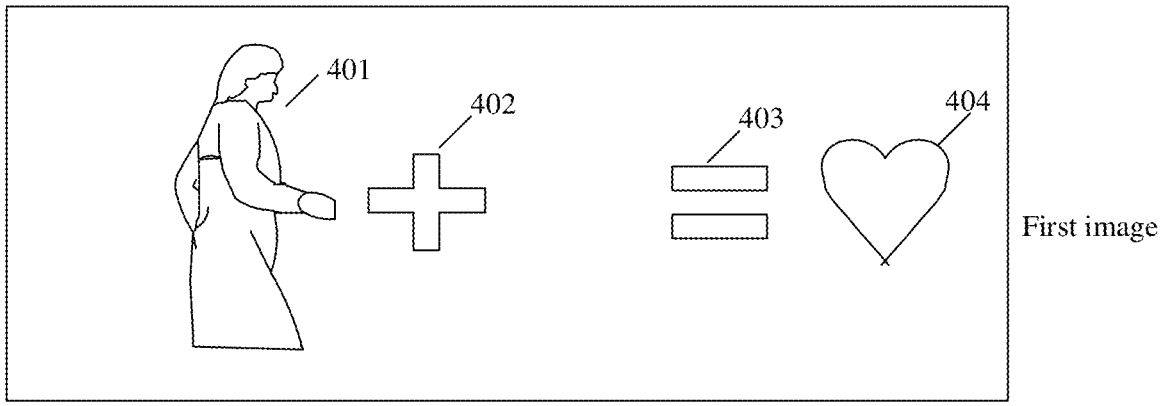
FIG. 4 is a schematic diagram of a first image according to an embodiment of the present disclosure.

The first image may include images of one or more first to-be-photographed subjects. FIG. 4 is a schematic diagram of a first image according to an embodiment of the present disclosure. The first image includes an image 401 of a first to-be-photographed subject and an image of a first photographing background, and the image of the first photographing background includes: "+" 402, "=" 403, and a "heart shape" 404.

S102: The terminal displays a first preview interface, where the first preview interface includes a first preview image, the first preview image includes an image of a second photographing background and an image of the second to-be-photographed subject, and a degree of coincidence between the image of the second photographing background and the image of the first photographing background is greater than or equal to a preset degree of coincidence.

The first preview image may be any preview image that meets "a degree of coincidence between an image of a photographing background and the image of the first photographing background is greater than or equal to the preset degree of coincidence" in a preview video stream of the terminal.

Figure 5A:
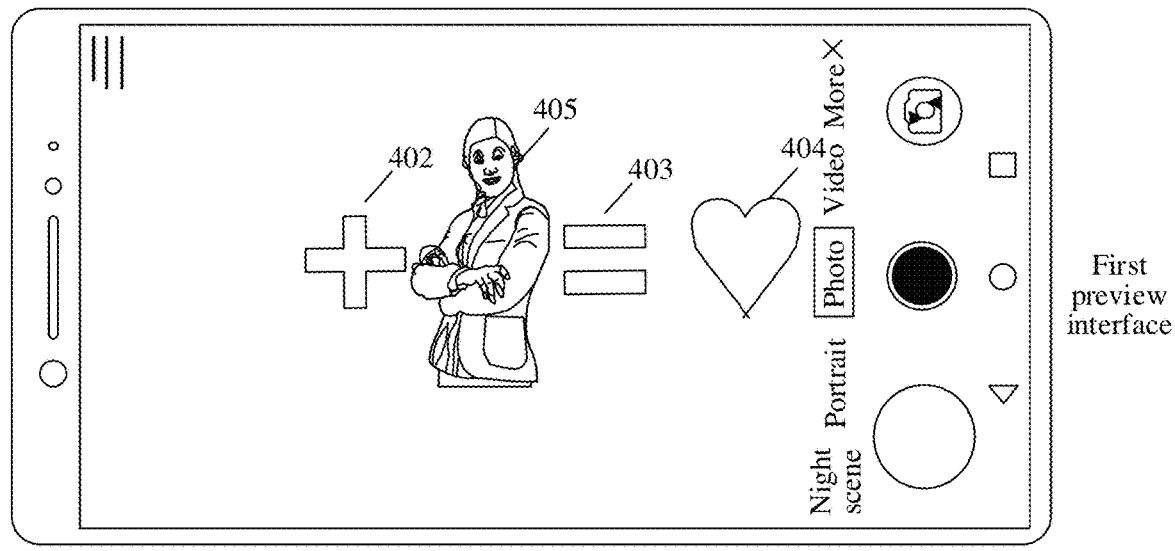
FIG. 5a is a schematic diagram of a first preview interface according to an embodiment of the present disclosure.

FIG. 5a is a schematic diagram of a first preview interface according to an embodiment of the present disclosure. The first preview interface includes a first preview image, the first preview image includes an image 405 of a second to-be-photographed subject and a second photographing background, and the second photographing background includes: "+" 402, "=" 403, and a "heart shape" 404.

In addition to the first preview image, the first preview interface may further include some controls in the camera application interface of the terminal, for example, controls such as "Night scene", "Portrait", "Photo", "Video", and a photographing button in FIG. 5a.

The degree of coincidence between the image of the second photographing background and the image of the first photographing background is a proportion of an area of a region of coincidence of the image of the second photographing background and the image of the first photographing background to an area of the image of the first photographing background.

A specific value, and a determining manner of the preset degree of coincidence are not limited in this embodiment. For example, the preset degree of coincidence may be determined based on a fusion technology used when S104 is performed, user satisfaction with a target image, or the like. Generally, when the degree of coincidence between the image of the second photographing background and the image of the first photographing background is less than or equal to a threshold, a higher degree of coincidence indicates a higher similarity between the second photographing background and the first photographing background, and a better fusion effect when S104 is performed.

The first preview image may include images of one or more second to-be-photographed subjects.

Optionally, the first preview interface may further include second information. The second information indicates at least one of a position, a pose, or a size of the image of the first to-be-photographed subject in the image of the second photographing background. Further, optionally, the second information specifically includes: a contour of the image of the first to-be-photographed subject: or a translucent image of the image of the first to-be-photographed subject.

In other words, a virtual group photo effect of the first to-be-photographed subject and the second to-be-photographed subject is displayed on the first preview interface, to help a user who takes a photograph guide the second to-be-photographed subject in the at least one of the position, the pose, and the size of the second to-be-photographed subject in the second photographing background, thereby improving a user experience effect and enhancing the user satisfaction with the target image.

Figure 5B:
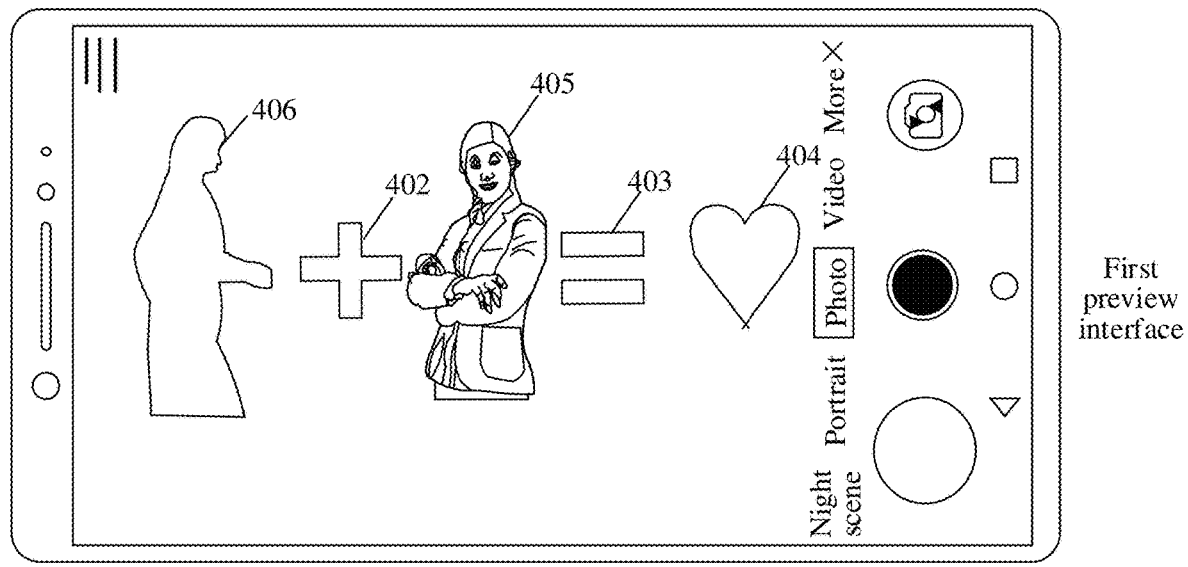
FIG. 5b is a schematic diagram of another first preview interface according to an embodiment of the present disclosure.

FIG. 5b is a schematic diagram of another first preview interface according to an embodiment of the present disclosure. FIG. 5b is drawn based on FIG. 5a. In addition, based on the first preview interface shown in FIG. 5a, the first preview interface shown in FIG. 5b further includes a contour 406 of the image of the first to-be-photographed subject. The contour 406 indicates a position, a pose, and a size of the first to-be-photographed subject in the second photographing background.

The terminal displays the second information on the first preview interface, which may include the following steps 11 to 14.

Step 11: The terminal extracts the image of the first to-be-photographed subject from the first image, and obtains position information of the image of the first to-be-photographed subject in the image of the first photographing background. The position information is relative position information, for example, first position information of the image of the first to-be-photographed subject relative to an image of a target static object in the image of the first photographing background.

Step 12: The terminal obtains, based on the image of the first to-be-photographed subject, the contour/translucent image of the image of the first to-be-photographed subject.

Step 13: The terminal aligns the image of the first photographing background with the image of the second photographing background, to obtain position information of the image of the first to-be-photographed subject in the image of the second photographing background. The position information is relative position information, for example, second position information of the image of the first to-be-photographed subject relative to the image of the target static object in the image of the second photographing background. A position indicated by the first position information is consistent with a position indicated by the second position information (for example, the position indicated by the first position information is the same as the position indicated by the second position information, or a difference between the positions indicated by the first position information and the second position information is within a preset range).

Optionally, the terminal aligns the image of the first photographing background with the image of the second photographing background, which may include the following. First, the terminal obtains feature points in the image of the first photographing background and the image of the second photographing background, for example, the image of the first photographing background and the image of the second photographing background are separately detected by using a scale-invariant feature transform (SIFT) algorithm or a corner detection algorithm, to obtain a feature point in the image of the first photographing background and a feature point in the image of the second photographing background. Then, the terminal determines, by using a registration algorithm, a pair of matching feature points in the image of the first photographing background and the image of the second photographing background. Two feature points in the pair of matching feature points represent a same part of a same object. For example, the feature points both represent a thumb of a left hand of a same person.

Currently, the registration algorithm mainly includes a traditional manual feature-based registration method and a convolutional neural network (CNN)-based registration method. For example, the conventional manual feature-based registration method includes: zooming in or out an image to a certain size, then detecting a local key point of a grayscale space of the zoomed-in or zoomed-out image, and then generating a feature descriptor at a key point position. Conversion to the grayscale space may effectively resolve a feature mismatch problem caused by a luminance inconsistency problem. Common feature descriptors for detecting the local key point include sift, surf, orb, and the like. Optionally, in consideration of a speed and accuracy, the terminal may use the surf as a final feature descriptor.

Figure 6:
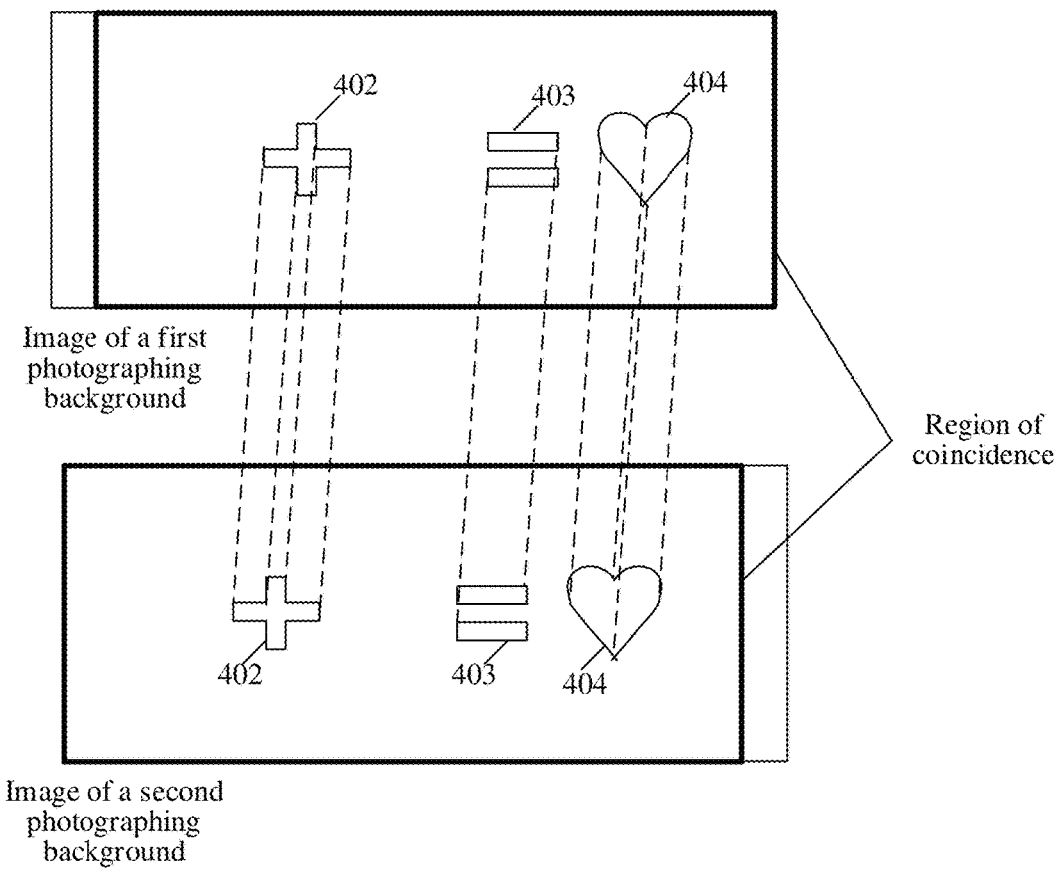
FIG. 6 is a schematic diagram of aligning an image of a first photographing background with an image of a second photographing background by a terminal according to an embodiment of the present disclosure.

FIG. 6 is a schematic diagram of aligning an image of a first photographing background with an image of a second photographing background by a terminal according to an embodiment of the present disclosure. FIG. 6 is described by using an example in which the image of the first photographing background in FIG. 4 is aligned with the image of the second photographing background in FIG. 5a. Two feature points connected by a same dashed line in FIG. 6 are a pair of matching feature points.

It should be noted that subsequently, the terminal may determine, based on an alignment result of the image of the first photographing background and the image of the second photographing background, a region of coincidence of the images of the two photographing backgrounds. For example, an image in a bold rectangular box in FIG. 6 represents the region of coincidence of the image of the first photographing background and the image of the second photographing background.

Step 14: The terminal displays the contour/translucent image of the image of the first to-be-photographed subject on the first preview interface. A position of the contour/translucent image in the image of the second photographing background is consistent with a position of the image of the first to-be-photographed subject in the image of the second photographing background.

For example, "a relative position between the image 401 of the first to-be-photographed subject and the target static object "+" 402 shown in FIG. 4" is the same as "a relative position between the contour 406 of the image 401 of the first to-be-photographed subject and the target static object "+" 402 shown in FIG. 5*b*".

Because it is the contour/translucent image of the image of the first to-be-photographed subject that is displayed in the first preview image, a pose of the contour/translucent image is the same as a pose of the first to-be-photographed subject.

It may be understood that before performing step 13, the terminal may need to zoom in or out the first image or the first preview image. For example, the terminal collects the first image in real time. When the terminal collects the first image and the first preview image, if the camera of the terminal has different distances from a same static object in the first photographing background and the second photographing background, sizes of the static object in the first photographing background and the second photographing background are different. In this case, before performing step 13, the terminal needs to zoom in or out the first image or the first preview image, so that sizes of the same static object in the first photographing background and the second photographing background are consistent.

During zooming in or out the first image or the first preview image, the terminal zooms in or out the contour/translucent image of the image of the first to-be-photographed subject. Subsequently, the terminal may display, based on the position information of the image of the first to-be-photographed subject in the image of the second photographing background, the zoomed-in or zoomed-out contour/translucent image of the image of the first to-be-photographed subject on the first preview interface.

Optionally, the terminal may display information that indicates "the degree of coincidence between the image of the second photographing background and the image of the first photographing background" in the first preview interface. For example, the terminal may directly display "the degree of coincidence is 70%", or display "the degree of coincidence is greater than or equal to the preset degree of coincidence". In this way, the user may learn whether information about the degree of coincidence between the image of the second photographing background and the image of the first photographing background meets an image fusion requirement, thereby improving user experience.

Figure 5C:
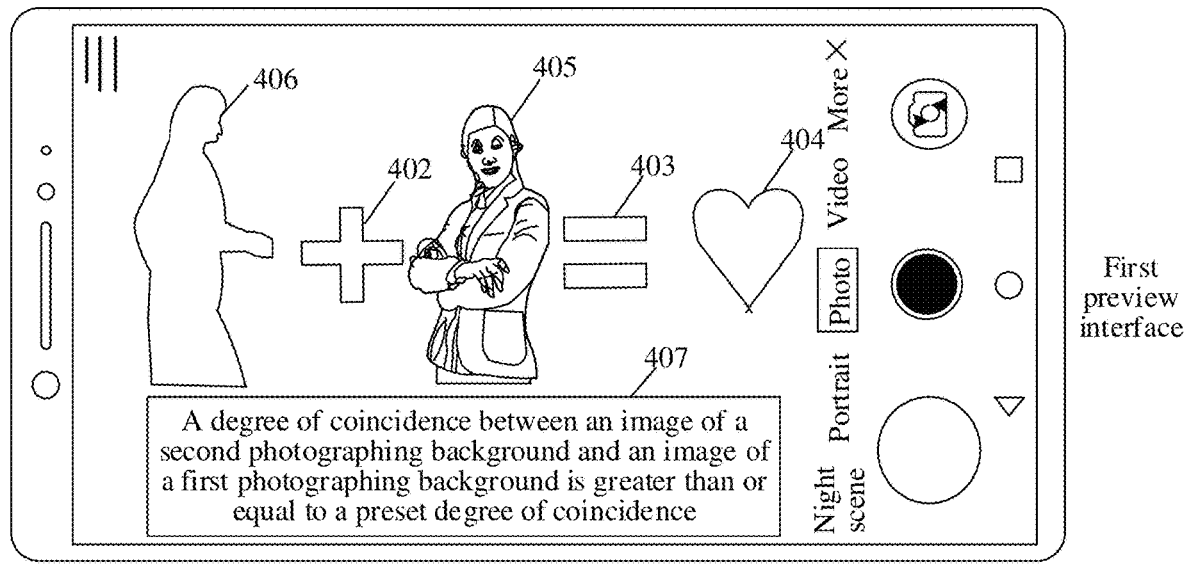
FIG. 5c is a schematic diagram of still another first preview interface according to an embodiment of the present disclosure.

FIG. 5*c* is a schematic diagram of another first preview image according to an embodiment of the present disclosure. FIG. 5*c* is drawn based on FIG. 5*b*. In addition, based on the first preview interface shown in FIG. 5*b*, the first preview interface shown in FIG. 5*c* further includes a prompt box 407. The prompt box 407 displays: the degree of coincidence between the image of the second photographing background and the image of the first photographing background is greater than or equal to the preset degree of coincidence.

S103: The terminal stores the first preview image.

For example, the terminal may automatically store the first preview image when determining that the degree of coincidence between the image of the second photographing background and the image of the first photographing background is greater than or equal to the preset degree of coincidence.

For another example, the terminal may store the first preview image under an instruction of the user, for example, after the user taps the photographing button in the first preview interface, or under a voice instruction of the user. For example, based on FIG. 5*c*, the user may tap the photographing button in the first preview interface based on a prompt of the prompt box 407, and the terminal stores the first preview image in response to the tapping operation.

It should be noted that S103 is an optional step.

S104: The terminal obtains a target image based on the first image and the first preview image, where the target image includes the image of the first to-be-photographed subject and the image of the second to-be-photographed subject. In addition, the target image further includes an image of a target photographing background.

The target image is a group photo of the plurality of to-be-photographed subjects. Optionally, the terminal displays the target image.

Figure 7:
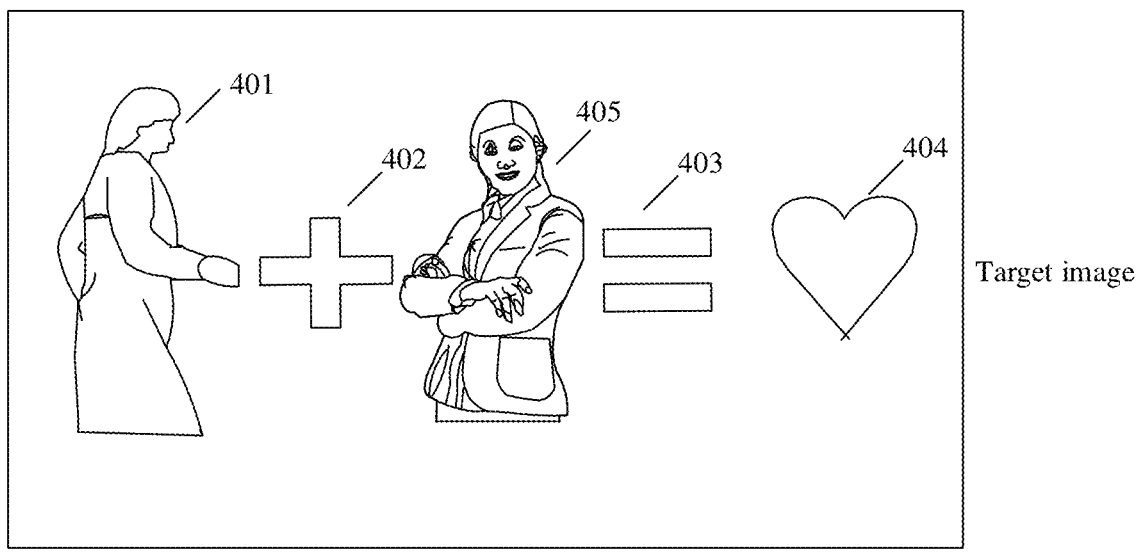
FIG. 7 is a schematic diagram of a target image according to an embodiment of the present disclosure.

FIG. 7 is a schematic diagram of a target image according to an embodiment of the present disclosure. FIG. 7 is drawn based on FIG. 4 and FIG. 5*a* (or FIG. 5*b* or FIG. 5*c*). The target image shown in FIG. 7 includes the image 401 of the first to-be-photographed subject, the image 405 of the second to-be-photographed subject, and an image of a target photographing background. The image of the target photographing background includes the "+" 402, the "=" 403, and the "heart shape" 404.

Optionally, the terminal fuses an image A and an image B to obtain the target image. The image A may be the first image, or an image obtained by processing (for example, image cropping or zooming) the first image. The image B may be the first preview image, or an image obtained by processing (for example, image cropping or zooming) the first preview image.

Based on this, S104 may include the following steps 21 and 22.

Step 21: The terminal aligns the image A with the image B.

It may be understood that, when performing step 13, the terminal may not perform step 21.

Step 22: The terminal fuses the aligned image A and image B. Specifically, this may be implemented in one of the following manners.

Manner 1: The terminal extracts the image of the first to-be-photographed subject in the image A, and fuses the image of the first to-be-photographed subject and the image B, to obtain the target image.

A position of the image of the first to-be-photographed subject in an image of a photographing background of the image A is consistent with a position of the image of the first to-be-photographed subject in an image of a photographing background of the target image.

Position consistency herein refers to relative position consistency. For example, a relative position between the image of the first to-be-photographed subject and an image of a static object in the image of the photographing background of the image A is the same as a relative position between the image of the first to-be-photographed subject and the image of the static object in the image of the photographing background of the image B (or a difference between the two relative relations is within a preset range).

Based on the manner 1, the image of the target photographing background in the target image is specifically an image other than "a background image shielded by the image of the first to-be-photographed subject" in the image of the photographing background of the image B.

Figure 8A:
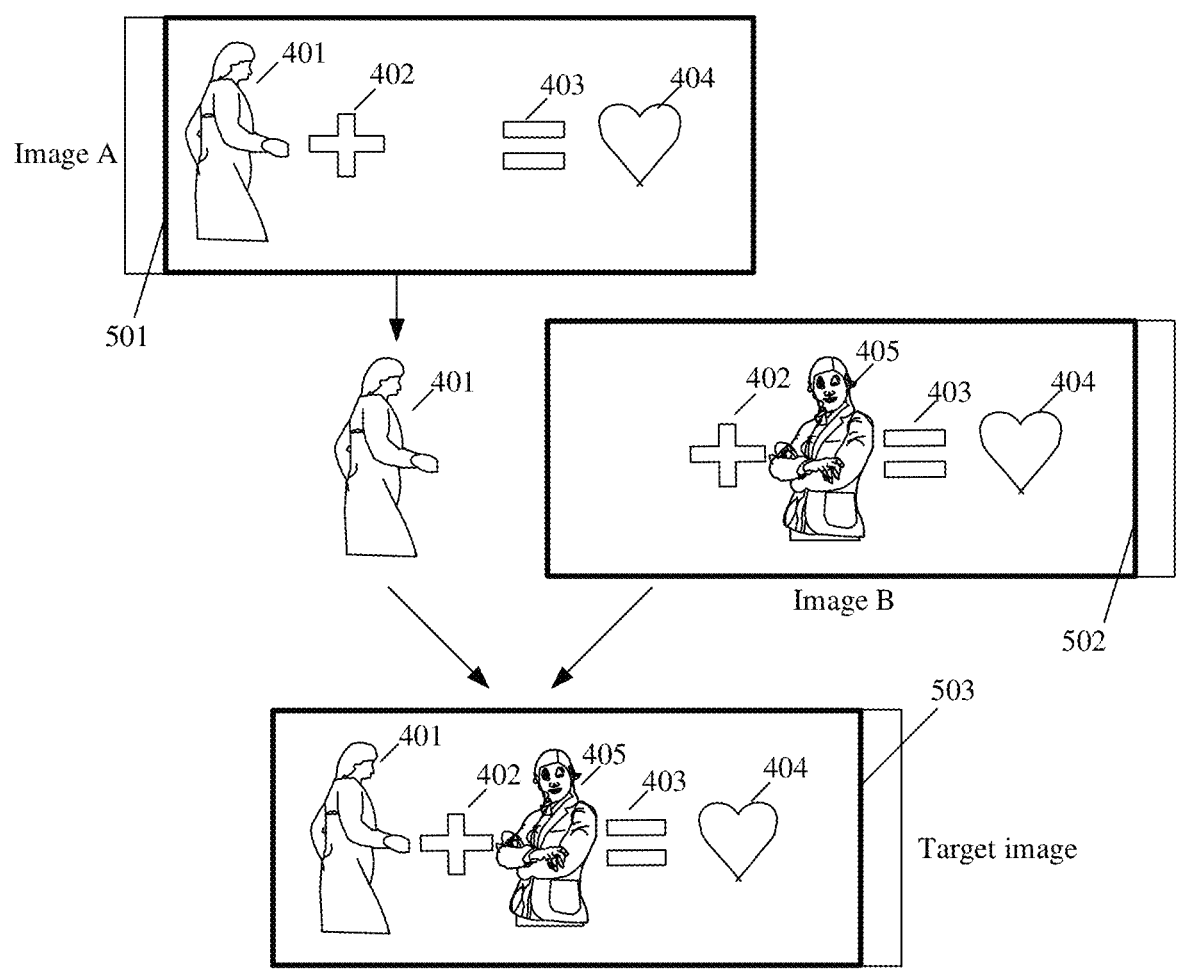
FIG. 8a is a schematic diagram of a process of a fusion method according to an embodiment of the present disclosure.

FIG. 8a is a schematic diagram of a process of a fusion method based on this manner according to an embodiment of the present disclosure. An image of a photographing background in a rectangle 501 in the image A is the same as an image of a photographing background in a rectangle 502 in the image B. An image of a photographing background in a rectangle 503 in the target image is an image other than the background image shielded by the image of the first to-be-photographed subject in the image of the photographing background in the rectangle 502 in the image B.

Optionally, the extracting the image of the first to-be-photographed subject in the image A includes: performing image segmentation on the image A based on the image of the second photographing background to obtain the image of the first to-be-photographed subject.

Figure 8B:
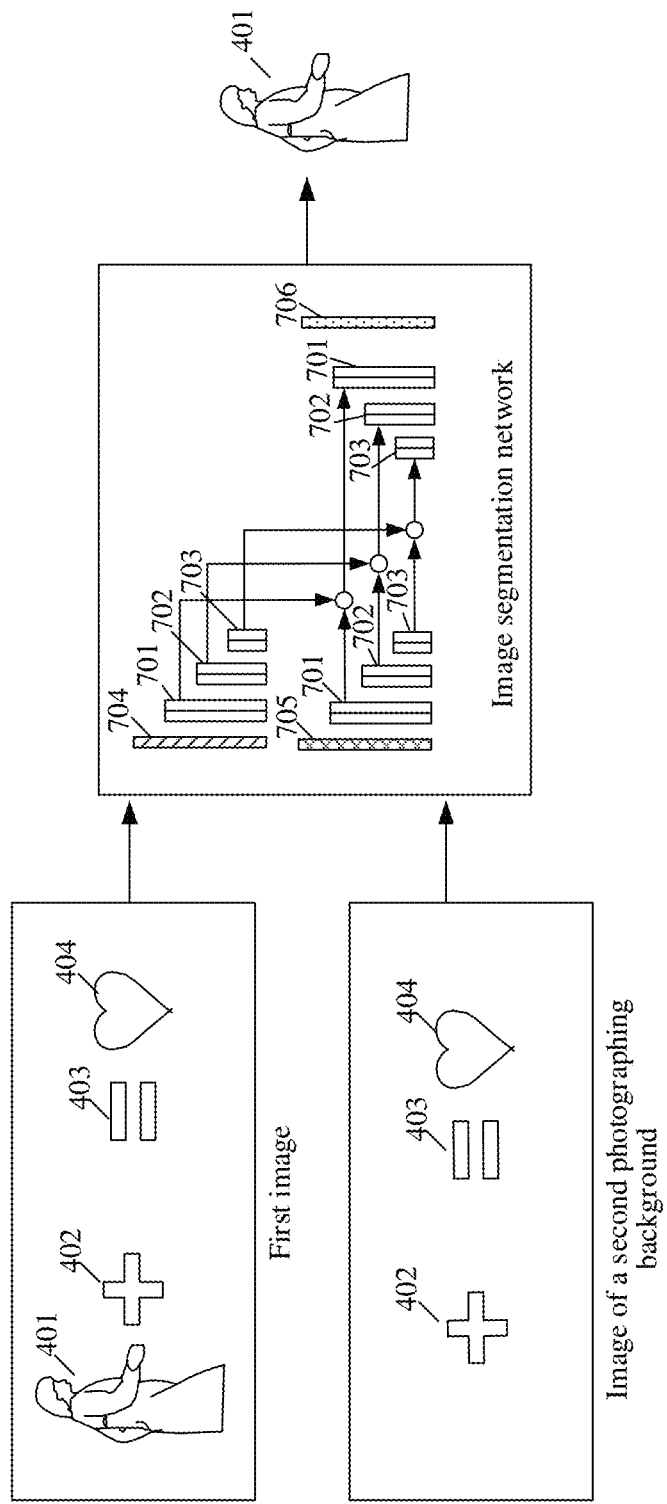
FIG. 8b is a schematic diagram of a process of extracting an image of a first to-be-photographed subject according to an embodiment of the present disclosure.

FIG. 8b is a schematic diagram of a process of extracting an image of a first to-be-photographed subject according to an embodiment of the present disclosure. FIG. 8b is described by using an example in which the image A is the first image. The first image and the image of the second photographing background are inputted into an image segmentation network, to obtain the image 401 of the first to-be-photographed subject. FIG. 8b shows a working principle of the image segmentation network. Specifically, image segmentation is performed on the first image with reference to the image of the second photographing background.

The image of the second photographing background has already been known, and an image (that is, the image of the first photographing background) of a photographing background in the first image coincides with (or is the same as) a part/all of the image of the second photographing background. Therefore, when performing image segmentation on the first image, for each pixel in a part of coincidence between the two photographing backgrounds, the terminal may directly determine, based on that the pixel is a pixel in the image of the second photographing background, that the pixel is a pixel in the image of the first photographing background, instead of a pixel in the image of the first to-be-photographed subject. Especially, for a pixel at a boundary between the image of the first to-be-photographed subject and the image of the first photographing background, the terminal may more accurately learn, with reference to a coincidence relationship between the second photographing background and the first photographing background, whether the pixel is a pixel in the image of the first photographing background or a pixel in the image of the first to-be-photographed subject, thereby improving accuracy of extracting the first to-be-photographed subject.

A part with a same number in the image segmentation network represents pixels of a same object in the first photographing background and the second photographing background. For example, a part 701, a part 702, and a part 703 may respectively represent pixels of the "+" 402, pixels of the "=" 403, and pixels of the "heart-shaped" 405 in the two photographing backgrounds.

In addition, a part 704 and a part 705 may represent different objects in the first image and a second image respectively. A part 706 represents a part determined based on the part 704 and the part 705.

Manner 2: The terminal extracts the image of the second to-be-photographed subject in the image B, and fuses the image of the second to-be-photographed subject and the image A to obtain the target image.

A position of the image of the second to-be-photographed subject in the image of the photographing background of the image B is consistent with a position of the image of the second to-be-photographed subject in the image of the photographing background of the target image.

Position consistency herein refers to relative position consistency. For example, a relative position between the image of the second to-be-photographed subject and an image of a static object in the image of the photographing background of the image B is the same as a relative position between the image of the second to-be-photographed subject and the image of the static object in the image of the photographing background of the image A (or a difference between the two relative relations is within the preset range).

Based on the manner 2, the image of the target photographing background in the target image is specifically an image other than "a background image shielded by the image of the second to-be-photographed subject" in the image of the photographing background of the image A.

Figure 8C:
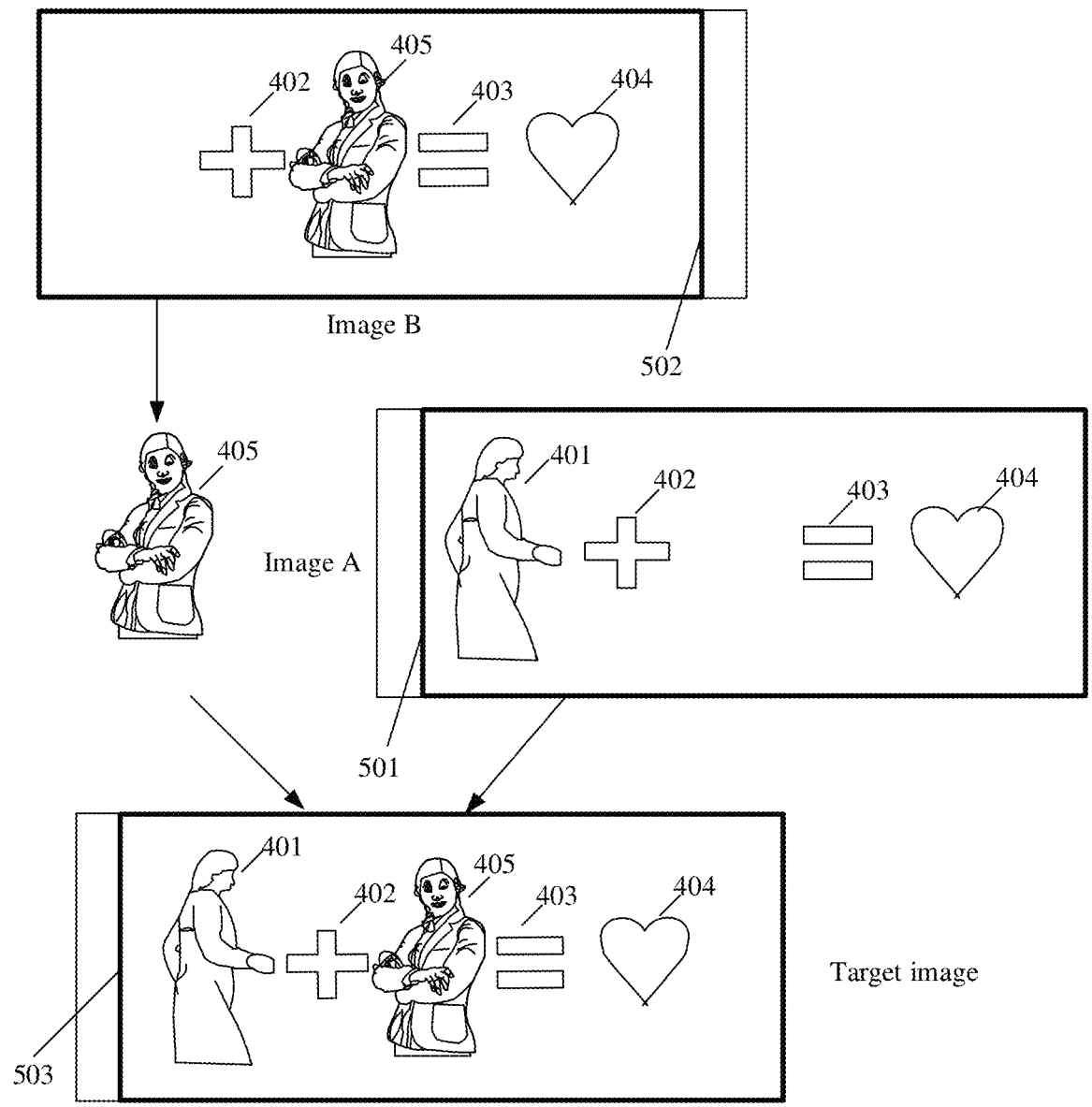
FIG. 8c is a schematic diagram of a process of another fusion method according to an embodiment of the present disclosure.

FIG. 8c is a schematic diagram of a process of a fusion method based on this manner according to an embodiment of the present disclosure. The image of the photographing background in the rectangle 501 in the image A is consistent with the image of the photographing background in the rectangle 502 in the image B. The image of the photographing background in the rectangle 503 in the target image is an image other than the background image shielded by the image of the second to-be-photographed subject in the image of the photographing background in the rectangle 501 in the image A.

Optionally, the extracting the image of the second to-be-photographed subject in the image B includes: performing image segmentation on the image B based on the image of the first photographing background to obtain the image of the second to-be-photographed subject. For a specific example, refer to FIG. 8b.

It should be noted that whether to select and use the foregoing manner 1 or manner 2 is not limited in this embodiment. Optionally, if a quantity of first to-be-photographed subjects is less than a quantity of second to-be-photographed subjects, the foregoing manner 1 may be selected. If the quantity of first to-be-photographed subjects is greater than the quantity of second to-be-photographed subjects, the foregoing manner 2 may be selected. This helps improve accuracy of extracting an image of a to-be-photographed subject, thereby improving fusion accuracy.

According to the photographing method provided in this embodiment, when a user needs to take a group photo of a plurality of to-be-photographed subjects, the terminal uses a part of the to-be-photographed subjects as the first to-be-photographed subject to obtain one frame of image, and uses the other part of the to-be-photographed subjects as the second to-be-photographed subject to obtain another frame of image by photographing. Then, based on the two frames of images, a target image including an image of the first to-be-photographed subject and an image of the second to-be-photographed subject is obtained, thereby achieving a group photo of the plurality of to-be-photographed subjects. Compared with the conventional technology, no help from the third party (for example, a passerby) is required, and therefore the implementation is convenient. In addition, compared with a technical solution with help of the third party, the technical solutions provided in embodiments of the present disclosure can further improve the user satisfaction with the group photo result (that is, the target image), thereby improving user experience.

It should be noted that the foregoing is all described by using an example in which the target image is obtained by using the first image and the first preview image. During actual implementation, multiple people who are about to take a group photo may take photos at least twice, and the terminal fuses images obtained through all times of photographing, to obtain the target image.

Figure 9:
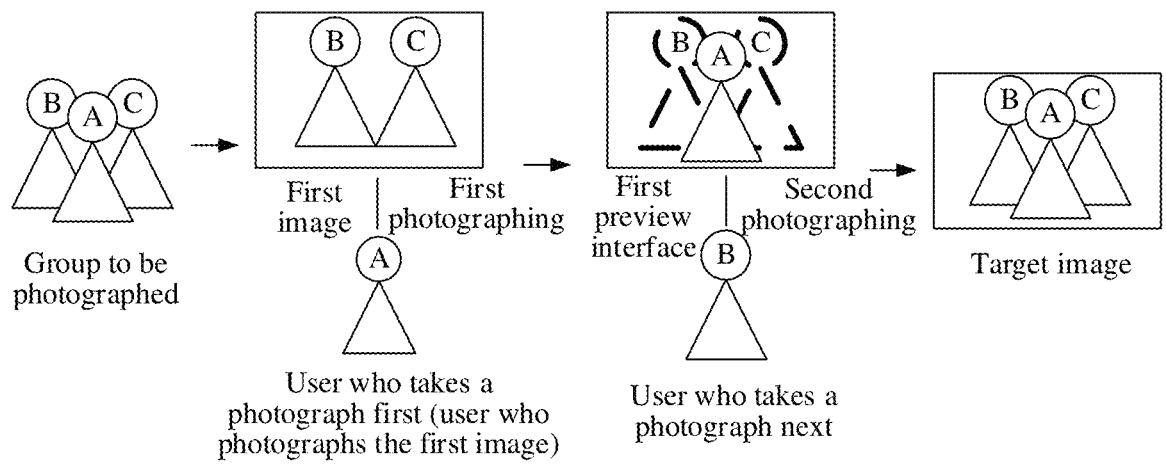
FIG. 9 is a schematic diagram of a process of an application scenario of a technical solution according to an embodiment of the present disclosure.

FIG. 9 is a schematic diagram of a process of an application scenario of a technical solution according to an embodiment of the present disclosure. Specifically, for a group (including to-be-photographed subjects A, B, and C) that needs to be photographed, the to-be-photographed subject A first photographs the to-be-photographed subjects B and C (that is, first photographing), to obtain a first image. Then, the to-be-photographed subject B or the to-be-photographed subject C (the to-be-photographed subject B is used as an example for description in FIG. 8) photographs the to-be-photographed subject A (that is, second photographing), to obtain a first preview interface. The first preview interface includes a first preview image and contours of images of the to-be-photographed subjects B and C. The first preview image includes an image of the to-be-photographed subject A. Then, the terminal fuses the first image and the first preview image to obtain a target image (that is, a group photo).

Figure 10:
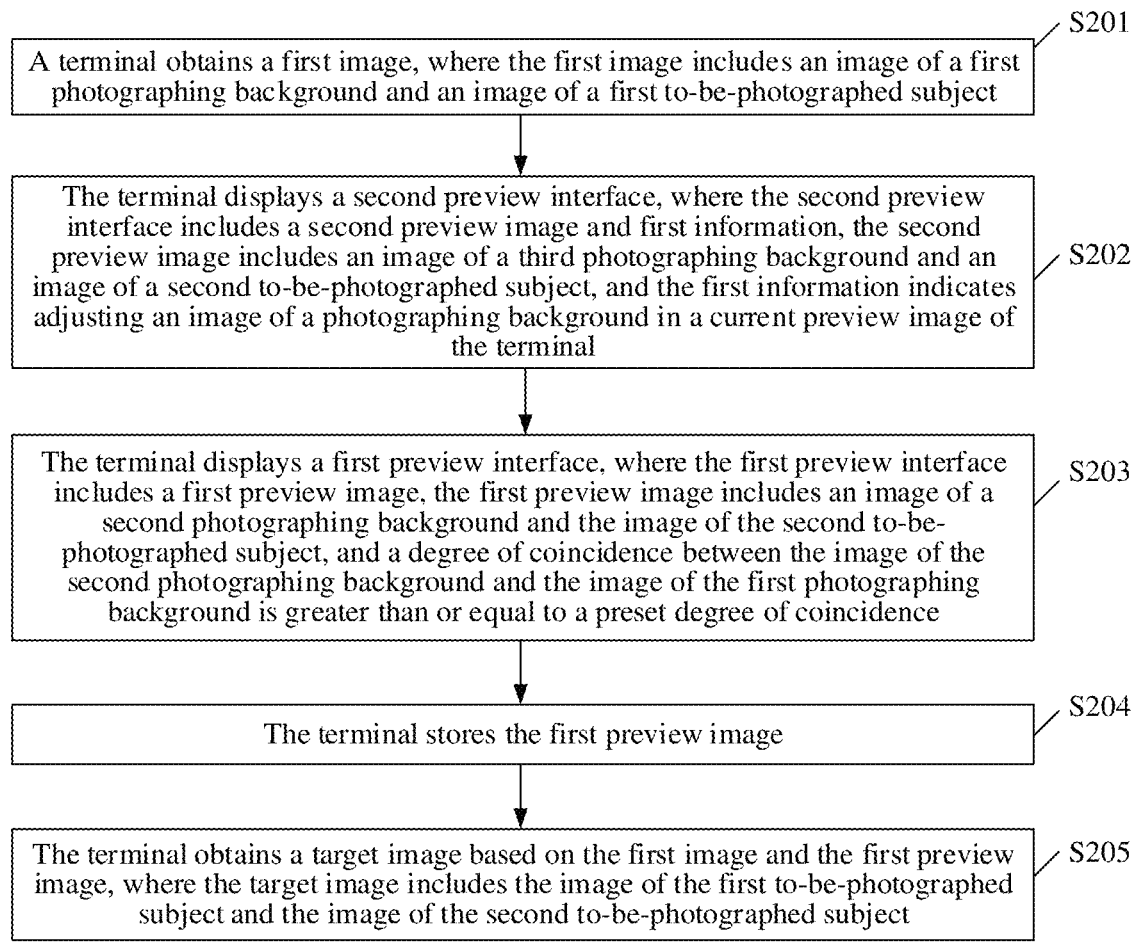
FIG. 10 is a flowchart of another photographing method according to an embodiment of the present disclosure.

FIG. 10 is a flowchart of another photographing method according to an embodiment of the present disclosure. The method shown in FIG. 10 is applied to a terminal to photograph a plurality of to-be-photographed subjects. The plurality of to-be-photographed subjects include a first to-be-photographed subject and a second to-be-photographed subject. The method includes the following steps.

For S201, refer to the foregoing S101. Certainly, the present disclosure is not limited thereto.

S202: The terminal displays a second preview interface, where the second preview interface includes a second preview image and first information, the second preview image includes an image of a third photographing background and the image of the second to-be-photographed subject, and the first information indicates adjusting an image of a photographing background in a current preview image of the terminal.

Specifically, the terminal may display the second preview image when determining that a degree of coincidence between the image of the third photographing background and the image of the first photographing background is less than the preset degree of coincidence. This is a technical solution proposed in consideration of "in this case, the image of the photographing background in the current preview image of the terminal needs to be adjusted, so that a degree of coincidence between an image of a photographing background of a current preview interface and the image of the first photographing background is greater than or equal to the preset degree of coincidence".

The second preview image may be any preview image that meets "a degree of coincidence between an image of a photographing background and the image of the first photographing background is less than the preset degree of coincidence" in a preview video stream of the terminal.

Optionally, the first information specifically indicates at least one of the following:

(1) A degree of coincidence between the image of the third photographing background and the image of the first photographing background is less than the preset degree of coincidence.

In this embodiment, a specific implementation of prompting that the degree of coincidence is less than the preset degree of coincidence is not limited. For example, the prompt may be any one of or a combination of manners such as a text prompt, a picture prompt, and highlighting.

Figure 11A:
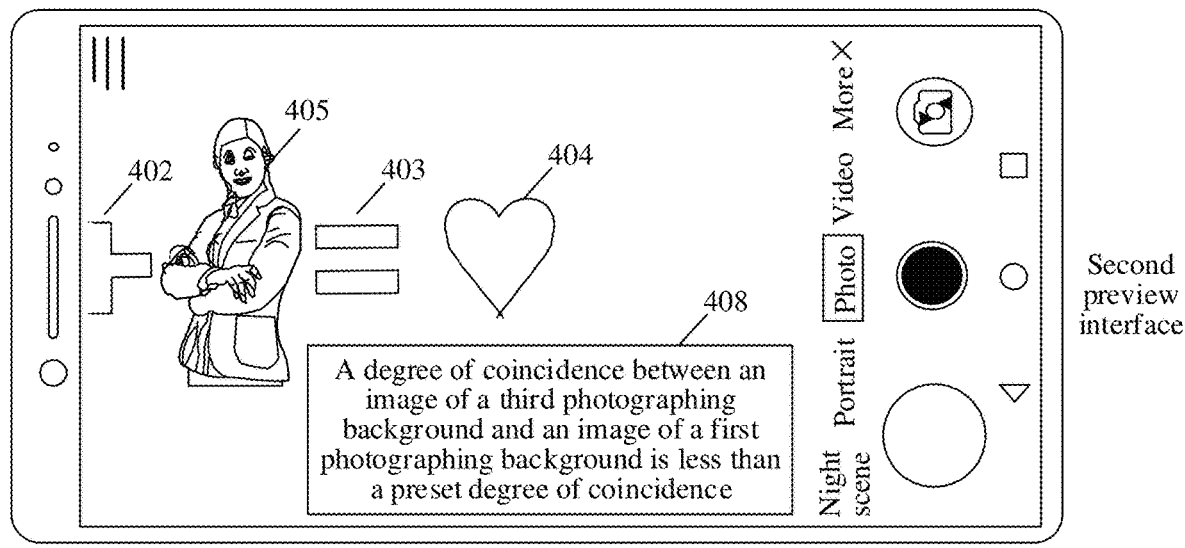
FIG. 11a is a schematic diagram of a second preview interface according to an embodiment of the present disclosure.

FIG. 11a is a schematic diagram of a second preview interface according to an embodiment of the present disclosure. The second preview interface includes the second preview image and the first information (for example, a prompt box 408), the second preview image includes the image 405 of the second to-be-photographed subject and the image of the third photographing background, and the third photographing background includes a part of the "+" 402, the "=" 403, and the "heart shape" 404. The prompt box 408 includes a text "the degree of coincidence between the image of the third photographing background and the image of the first photographing background is less than the preset degree of coincidence".

In addition to the second preview image and the first information, the second preview interface may further include some controls in the camera application interface of the terminal, for example, controls such as "Night scene", "Portrait", "Photo", "Video", and a photographing button in FIG. 11a.

(2) A target position of the terminal.

The target position of the terminal is a position of the terminal after movement. The user moves the terminal based on the first information, which helps improve the degree of coincidence between the image of the photographing background of the current preview interface and the image of the first photographing background.

In this embodiment, a manner of determining the target position and a specific representation form of the target position are not limited. For example, the target position may be "the terminal moves (such as translates, rotates, or moves forward and backward) toward an orientation", "the terminal moves toward an orientation by a quantity of meters", or "the terminal is moved to a position". Front, back, left, and right herein may be relative to a user who holds the terminal during photographing. Certainly, the present disclosure is not limited thereto in specific implementation.

Figure 11B:
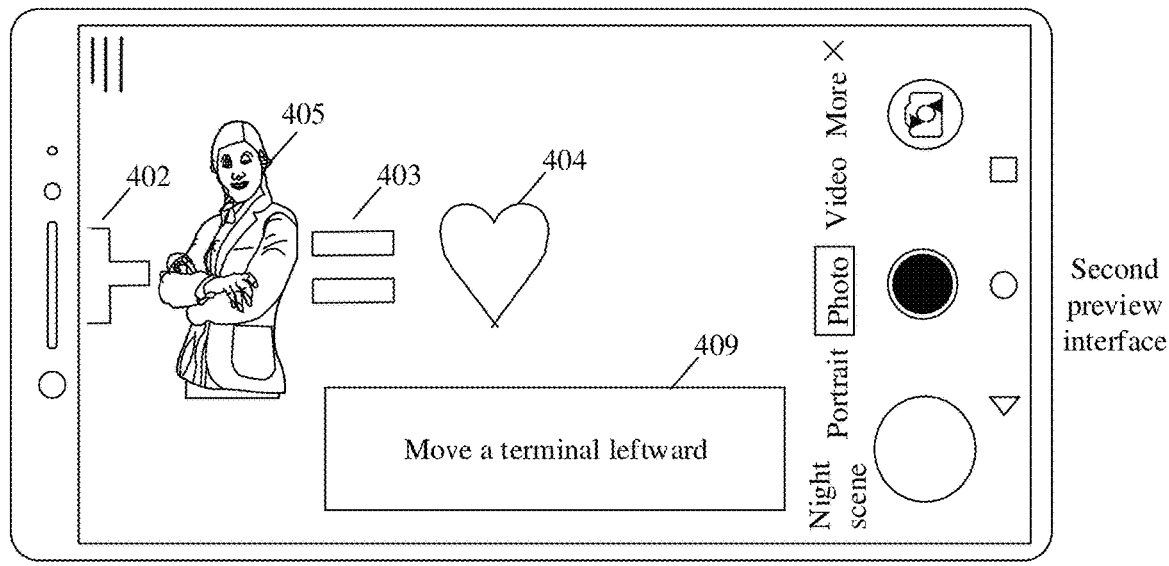
FIG. 11b is a schematic diagram of a second preview interface according to an embodiment of the present disclosure.

FIG. 11b is a schematic diagram of a second preview interface according to an embodiment of the present disclosure. The second preview interface includes the second preview image and the first information (for example, a prompt box 409). The second preview image in FIG. 11b is the same as the second preview image in FIG. 11a. The prompt box 409 includes a text "move the terminal leftward". "Left" herein is relative to the user who holds the terminal during photographing.

Specifically, first, the terminal obtains feature points in the first image and the second preview image. Second, the terminal removes a feature point of the first to-be-photographed subject from the first image to obtain a feature point of the image of the first photographing background, and removes a feature point of the second to-be-photographed subject from the second preview image to obtain a feature point of the image of the third photographing background. Then, the terminal calculates, based on the feature point of the image of the first photographing background and the feature point of the image of the third photographing background, a homography matrix between the image of the first photographing background and the image of the third photographing background. Homography transformation describes a position mapping relationship between an object in a world coordinate system and the object in a pixel coordinate system, and a corresponding transformation matrix is referred to as a homography matrix. Finally, the terminal determines the target position of the terminal based on the homography matrix.

(3) The degree of coincidence between the image of the third photographing background and the image of the first photographing background.

For example, the first information is that the degree of coincidence between the image of the third photographing background and the image of the first photographing background is 50%. For the user, the user may adjust the position of the terminal based on the degree of coincidence, to adjust a background image of the current preview image.

For S203 to S205, refer to the foregoing S102 to S104. Certainly, the present disclosure is not limited thereto.

According to the photographing method provided in this embodiment, the terminal instructs, based on a degree of coincidence between the image of the photographing background in the current preview image and an image of a photographing background of the first image, the user to adjust the position of the terminal. After the position of the terminal is adjusted, the photographing background of the current preview image of the terminal changes accordingly. Therefore, this helps improve the degree of coincidence between the image of the photographing background of the current preview interface and the image of the first photographing background, thereby improving a fusion effect and user satisfaction with the target image.

The following describes a method for obtaining a first image by a terminal in real time according to an embodiment of the present disclosure.

Figure 12:
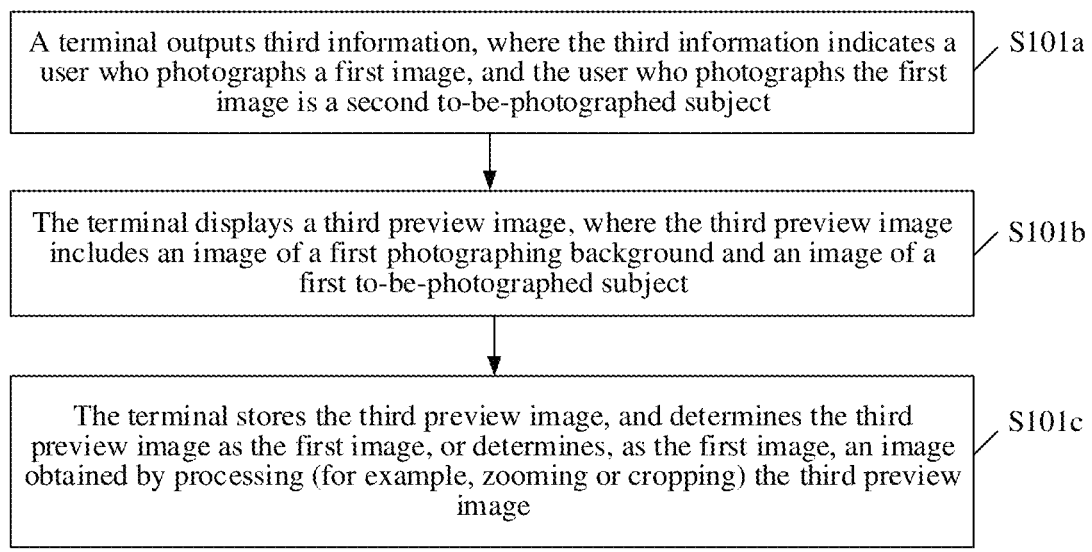
FIG. 12 is a flowchart of a method for obtaining a first image by a terminal in real time according to an embodiment of the present disclosure.

FIG. 12 is a flowchart of the method for obtaining a first image by a terminal in real time according to an embodiment of the present disclosure. The method includes the following steps.

S101a: The terminal outputs third information, where the third information indicates a user who photographs the first image, and the user who photographs the first image is the second to-be-photographed subject. If there are a plurality of second to-be-photographed subjects, the user who photographs the first image may be one of the second to-be-photographed subjects.

For example, the terminal displays the third information on a display, and the third information may be a text, a picture, a special mark (for example, a frame at a position of the second to-be-photographed subject is displayed, such as highlighted, displayed in bold, or displayed in different colors, to differentiate the frame from a frame at a position of another to-be-photographed subject), or the like.

For another example, the terminal outputs the third information by using voice information. Certainly, the present disclosure is not limited thereto in specific implementation.

A specific implementation of S101a is not limited in this embodiment. Several implementations are listed below.

Manner 1: The terminal displays a target photographing template, where the target photographing template indicates a position relationship between the plurality of to-be-photographed subjects. Then, the terminal outputs the third information based on the target photographing template. In this manner, the terminal determines the third information based on the target photographing template, and the target photographing template is selected from a plurality of photographing templates in a photographing template library. The photographing template library may reuse a photographing template library in any conventional technology. Therefore, this technical solution is applicable in a wide range.

A photographing template may also be referred to as a photographing template image. The photographing template may indicate a total quantity of the to-be-photographed subjects, a position relationship between the to-be-photographed subjects, and the like.

Optionally, the photographing template may further indicate poses of the to-be-photographed subjects. The "pose" described in this embodiment may be an overall posture (for example, a standing posture or a sitting posture) of a human body, or may be a local posture (for example, a gesture) of a human body.

Optionally, a quantity of portraits in the photographing template is determined based on a quantity of to-be-photographed subjects (that is, a quantity of persons who take a group photo, that is, a sum of a quantity of first to-be-photographed subjects and a quantity of second to-be-photographed subjects). For example, the quantity of portraits in the photographing template is the same as the quantity of to-be-photographed subjects.

Optionally, there may be a correspondence between the photographing template and "a character relationship (such as a couple relationship, a bestie relationship, or a family relationship) of the to-be-photographed subjects". In other words, the target photographing template may be different when the character relationship of the to-be-photographed subjects is different.

Optionally, there may be a correspondence between the photographing template and a photographing scenario. For example, each photographing scenario corresponds to one or more photographing templates. The photographing scenario may be, for example, but is not limited to, one or more of a sunset scenario, a seaside scenario, a grassland scenario, a road scenario, a wallside scenario, a stair scenario, a railing scenario, an indoor scenario, or a dining table scenario.

In an implementation, a plurality of photographing templates are pre-stored in the terminal. The plurality of photographing templates may be pre-downloaded by the terminal from a network device, and these photographing templates are updatable. In this case, after the camera application is started, the terminal may obtain a current photographing scenario based on a preview image, or obtain the current photographing scenario under an instruction of the user (for example, after the terminal displays a plurality of photographing scenarios, the user selects one of the photographing scenarios as the current photographing scenario); and then select, based on the current photographing scenario, one photographing template corresponding to the current photographing scenario from the plurality of pre-stored photographing templates, and use the selected photographing template as the target photographing template, and display the target photographing template on the display.

In another implementation, the terminal may send the preview image to the network device after the camera application is started. Then, the network device obtains the current photographing scenario based on the preview image, selects, based on the current photographing scenario, one photographing template corresponding to the current photographing scenario from the plurality of pre-stored photographing templates, and uses the selected photographing template as the target photographing template. Then, the network device sends information about the target photographing template to the terminal, and the terminal displays the target photographing template on the display.

The outputting, by the terminal, the third information based on the target photographing template may be specifically implemented by using the following solution 1 or solution 2.

Solution 1: The terminal outputs the third information based on the target photographing template and a human-computer interaction operation.

Specifically, the terminal receives a first operation, where the first operation is used to select a user in the target photographing template who photographs the first image; and the terminal outputs the third information in response to the first operation.

Figure 13:
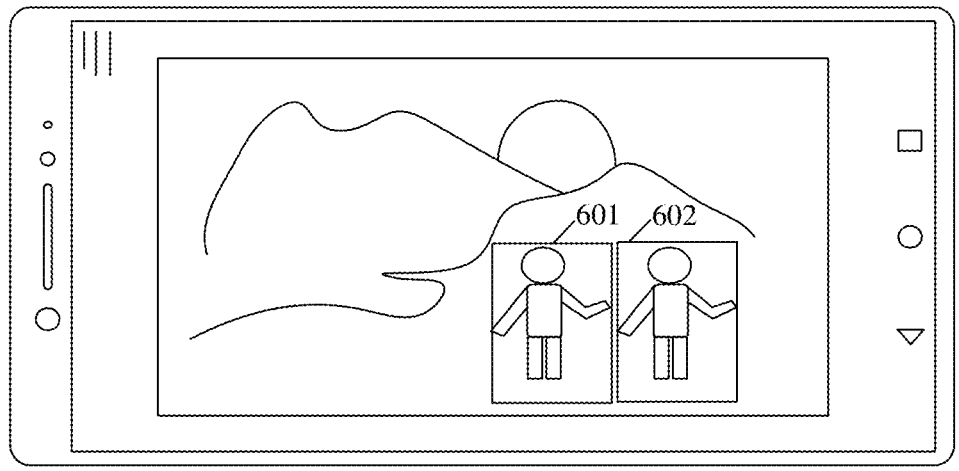
FIG. 13 is a schematic diagram of an operation process in which a terminal outputs third information based on a target photographing template according to an embodiment of the present disclosure.
Figure 13:
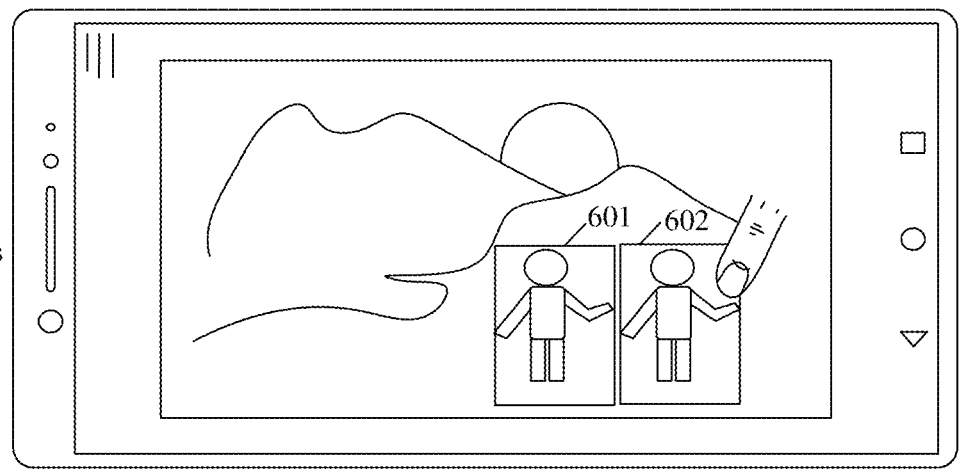
Figure 13:
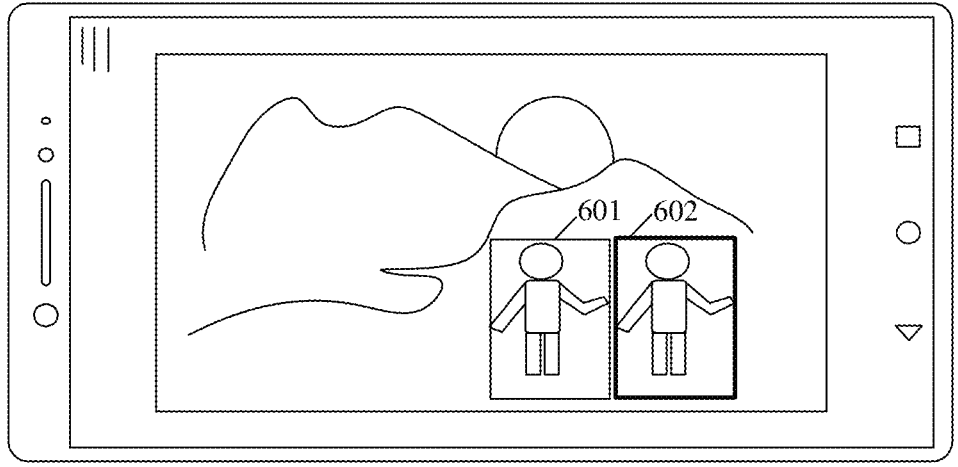

In an example, the target photographing template displayed on the display of the terminal is shown in a figure a in FIG. 13. The target photographing template is a photographing template corresponding to the sunset scenario. The target photographing template includes a portrait 601 and a portrait 602. A position relationship between the two portraits and a relationship between a background and the two portraits are shown in the figure a in FIG. 13. After displaying the target photographing template, the terminal receives a first operation (for example, a touchscreen operation) of the user on a region in which a to-be-photographed subject in the target photographing template is located. As shown in a figure b in FIG. 13, the terminal performs the touchscreen operation on a region in which the portrait 602 is located. In response to the first operation, the terminal specifically displays, in bold, a frame in which the portrait on which the operation is performed is located, as shown in a figure c in FIG. 13. It can be learned based on the figure c in FIG. 13 that the user who photographs the first image is a user represented by a portrait located in a frame displayed in bold. In specific implementation, if two to-be-photographed subjects need to take a group photo according to the target photographing template in FIG. 13, a left to-be-photographed subject is the first to-be-photographed subject, a right to-be-photographed subject is the second to-be-photographed subject, and the second to-be-photographed subject is the user who photographs the first image.

The terminal determines, through human-computer interaction, the user who photographs the first image, which helps improve a sense of participation of the user and enhance user experience.

Solution 2: The terminal automatically outputs the third information based on the target photographing template. The user who photographs the first image may be any one of the following:

(1) The user who photographs the first image is a user represented by a portrait in the target photographing template whose range of coincidence with another portrait is less than or equal to a preset range of coincidence (for example, the portrait does not coincide with the another portrait).

For a portrait that does not coincide or has a smaller range of coincidence with another portrait, image fusion is easier to be performed when the portrait is fused with the another portrait, and tolerance of a deviation between positions of the portrait in background images of different images is higher. Therefore, a user represented by the portrait is selected as the user who photographs the first image (that is, the user represented by the portrait is used as the second to-be-photographed subject), which helps improve a fusion effect of the target image, thereby improving user satisfaction with the target image.

Figure 14:
FIG. 14 is a schematic diagram of image instance segmentation according to an embodiment of the present disclosure.
Figure 14:
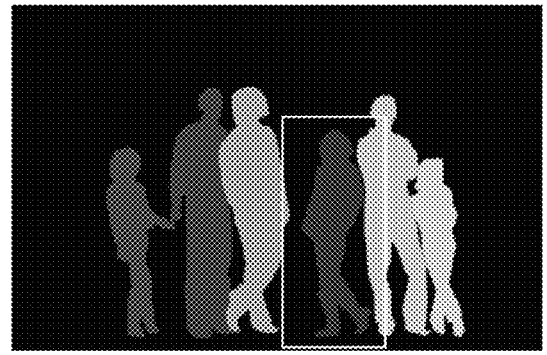

In an example, the target photographing template includes a plurality of portraits, as shown in a figure a in FIG. 14. The portrait in the target photographing template may be visualized in various manners, for example, the portrait may be a cartoon or a simple stroke.

In this case, the terminal may determine, by using an image instance segmentation algorithm, the user who photographs the first image. FIG. 14 is a schematic diagram of image instance segmentation. Details are as follows:

First, the terminal inputs the target photographing template shown in the figure a in FIG. 14 into an instance segmentation algorithm model, and an output of the model is a mask of each portrait in the template, as shown in a figure b in FIG. 14. The mask of each portrait is a connected region.

Then, the terminal obtains a degree of connection between masks of every two portraits in the figure b in FIG. 14. If a degree of connection between a mask of a portrait and masks of portraits with a quantity greater than or equal to a preset quantity is less than a threshold, it is determined that a range of coincidence between the portrait and another portrait is less than or equal to a preset range of coincidence, and a user represented by the portrait is used as the user who photographs the first image.

In another example, the target photographing template includes masks of a plurality of portraits, as shown in the figure b in FIG. 14. In this case, the terminal may obtain the degree of connection between masks of every two portraits, and determine, based on this, the user who photographs the first image. For a specific method, refer to the foregoing description.

(2) The user who photographs the first image is a user represented by a portrait closest to a camera of the terminal in the target photographing template.

Because the portrait closest to the camera of the terminal is not shielded by another portrait, image fusion is easier to be performed when the portrait is fused with the another portrait. In addition, tolerance of a deviation between positions of the portrait in background images of different images is higher. Therefore, using a user represented by the portrait as the user who photographs the first image (that is, the user is used as the second to-be-photographed subject) helps improve a fusion effect of the target image, thereby improving user satisfaction with the target image.

Optionally, the terminal may implement the technical solution in 2) by using the following steps.

Figure 15:
FIG. 15 is a schematic diagram of a target photographing template according to an embodiment of the present disclosure.
Figure 15:
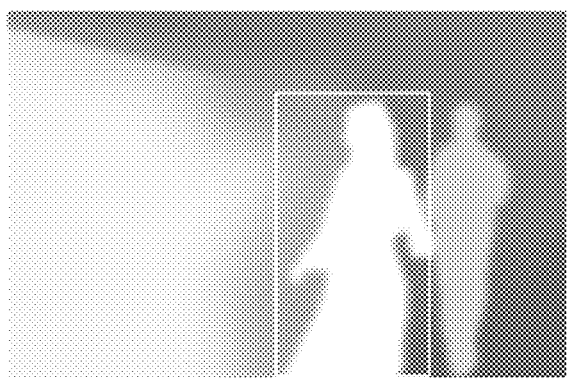
Figure 15:
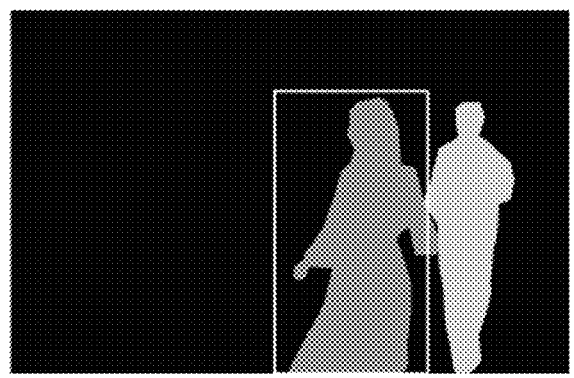

First, the terminal obtains a depth estimation result of each portrait in the target photographing template by using an image depth estimation algorithm. For example, a figure a in FIG. 15 is a schematic diagram of a target photographing template, and a figure b in FIG. 15 is a depth estimation result, obtained by the terminal, of each portrait in the target photographing template shown in the figure a in FIG. 15.

Then, the terminal obtains a mask of each portrait in the target photographing template by using the image instance segmentation algorithm. For example, a figure c in FIG. 15 is the mask of each portrait in the target photographing template shown in the figure a in FIG. 15 and obtained by the terminal.

Then, the terminal obtains a correspondence between a mask of a portrait and a depth estimation result of the portrait. For example, there is a correspondence between a depth estimation result of a portrait marked by a rectangular box in the figure b in FIG. 15 and a mask of a portrait marked by a rectangular box in the figure c in FIG. 15. Correspondingly, the portrait is a portrait marked by a rectangular box in the figure a in FIG. 15.

Finally, the terminal determines, based on the correspondence, a depth value of each portrait in the target photographing template, to determine, based on the depth value of each portrait, a distance between a user represented by each portrait and the camera of the terminal.

(3) The user who photographs the first image is a user represented by an outermost portrait in the target photographing template, or a user represented by a portrait whose distance from another portrait is greater than a preset distance.

Figure 16:
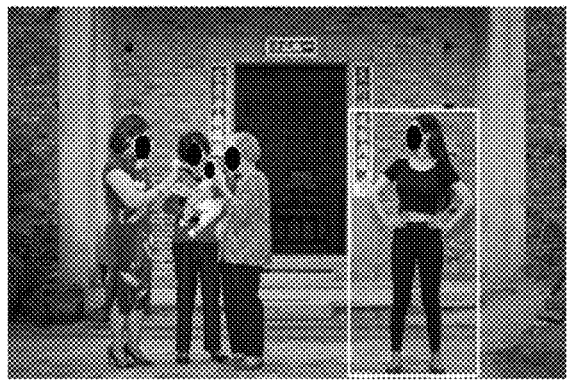
FIG. 16 is a schematic diagram of another target photographing template according to an embodiment of the present disclosure.
Figure 16:
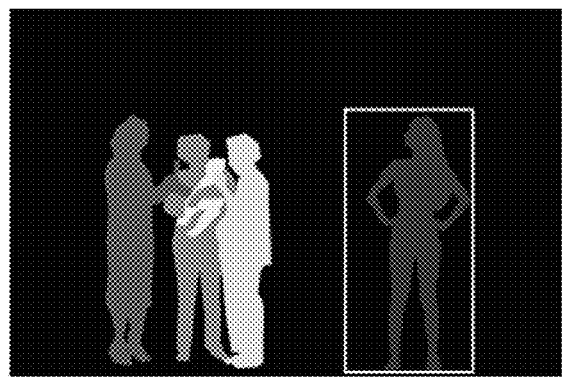

That the portrait whose distance from another portrait is greater than the preset distance may be understood as a portrait that deviates from the another portrait. A figure a in FIG. 16 is a schematic diagram of a target photographing template in this scenario. In the target photographing template, a portrait marked by a rectangular box is far away from another portrait.

When a user represented by an outermost portrait or a portrait that deviates from another portrait in the target photographing template is used as the user (that is, the second to-be-photographed subject) who photographs the first image, tolerance of a deviation of a position of an image of the user in the target image is higher during image fusion. Therefore, a target image obtained by fusion can improve user satisfaction more easily.

Specifically, the terminal may obtain, based on the foregoing instance segmentation method, a mask of each portrait in the target photographing template, and determine, based on a distance between masks of every two portraits, a distance between the two portraits, to determine the user who photographs the first image. For example, a figure b in FIG. 16 is a mask, obtained based on the figure a in FIG. 16, of a portrait in the target photographing template.

It should be noted that the foregoing enumerated manners of determining the user who photographs the first image may be applied to a scenario in which the second to-be-photographed subject is fused into the first image (which may be replaced with the foregoing image A) to obtain the target image. This is a technical solution proposed considering that "in an actual application, based on a photographing habit of the public, when multiple people take a group photo, generally, only one of the persons is used as the second to-be-photographed subject, and the rest are used as the first to-be-photographed subject. That is, a quantity of the second to-be-photographed subject is generally less than or equal to a quantity of the first to-be-photographed subject. In this case, fusing the second to-be-photographed subject into the first image makes a better fusion effect".

In a scenario in which the first to-be-photographed subject is fused into the first preview image (which may be replaced with the foregoing image B) to obtain the target image, how to determine the user who photographs the first image may be obtained based on the foregoing idea.

Manner 2: The terminal displays a target photographing template, where the target photographing template indicates the third information and a position relationship between the plurality of to-be-photographed subjects.

For a method for determining the target photographing template by the terminal, refer to related descriptions in the foregoing manner 1.

In the manner 2, in addition to the functions described in the manner 1, the target photographing template further indicates the third information. For example, the target photographing template is selected from a plurality of photographing templates in a photographing template library, and a user who photographs the first image is predefined in each photographing template (specifically, a position of the user who photographs the first image in the photographing template is predefined). In this way, after determining to display the target photographing template, the terminal does not need to separately determine and display the third information, thereby saving computing resources of the terminal.

Optionally, in this manner, after displaying the target photographing template, the terminal may re-determine the third information through human-machine interaction under an instruction of the user. In other words, the user may finally specify the user who photographs the first image in the target photographing template, instead of using a to-be-photographed subject recommended by the target photographing template as the user who photographs the first image.

Figure 17:
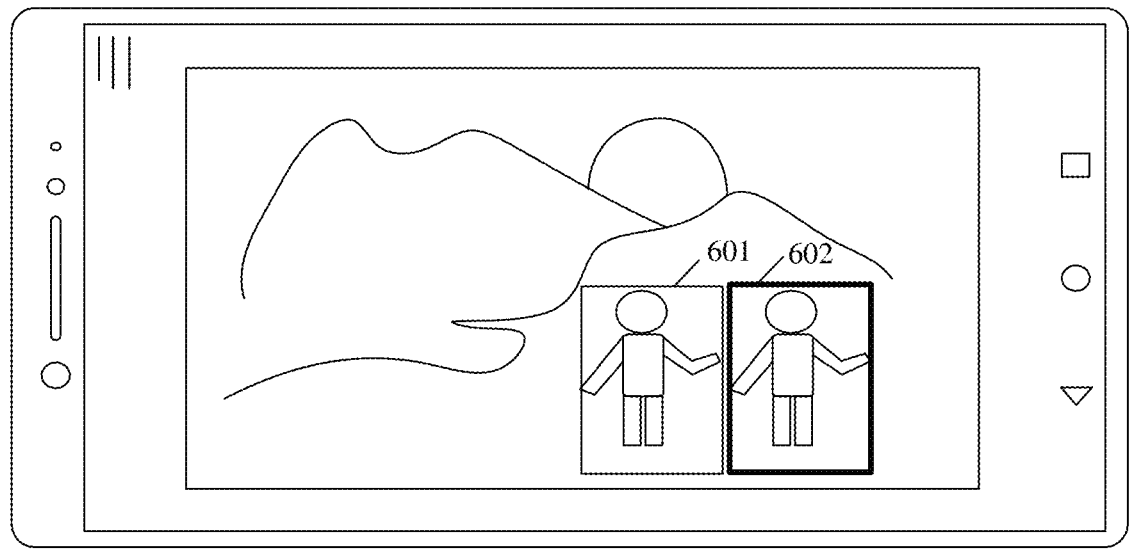
FIG. 17 is a schematic diagram of still another target photographing template according to an embodiment of the present disclosure.

FIG. 17 is a schematic diagram of a target photographing template according to an embodiment of the present disclosure. The target photographing template is a photographing template corresponding to the sunset scenario. The target photographing template includes a portrait 601 and a portrait 602. A position relationship between the two portraits and a relationship between a background and the two portraits are shown in FIG. 17. In addition, in the target photographing template, a frame (that is, the third information) of a region in which the portrait 602 is located is further displayed in bold to indicate that a user represented by the portrait 602 is the user who photographs the first image.

S101b: The terminal displays a third preview image, where the third preview image includes the image of the first photographing background and the image of the first to-be-photographed subject.

S101c: The terminal stores the third preview image, and determines the third preview image as the first image, or determines, as the first image, an image obtained by processing (for example, zooming or cropping) the third preview image.

For example, the terminal automatically stores a preview image, or stores the preview image under an instruction of the user (for example, after the user taps a photographing button).

According to the technical solution provided in this embodiment, in a scenario that multiple people take a group photo, the terminal actively recommends, to a user, the user who takes the first image. This helps improve user experience. In addition, when a recommendation rule used by the terminal is proper, this helps improve a fusion effect of the first image and the first preview image, thereby improving the user satisfaction.

The following describes an application example of the technical solution provided in this embodiment.

Figure 18:
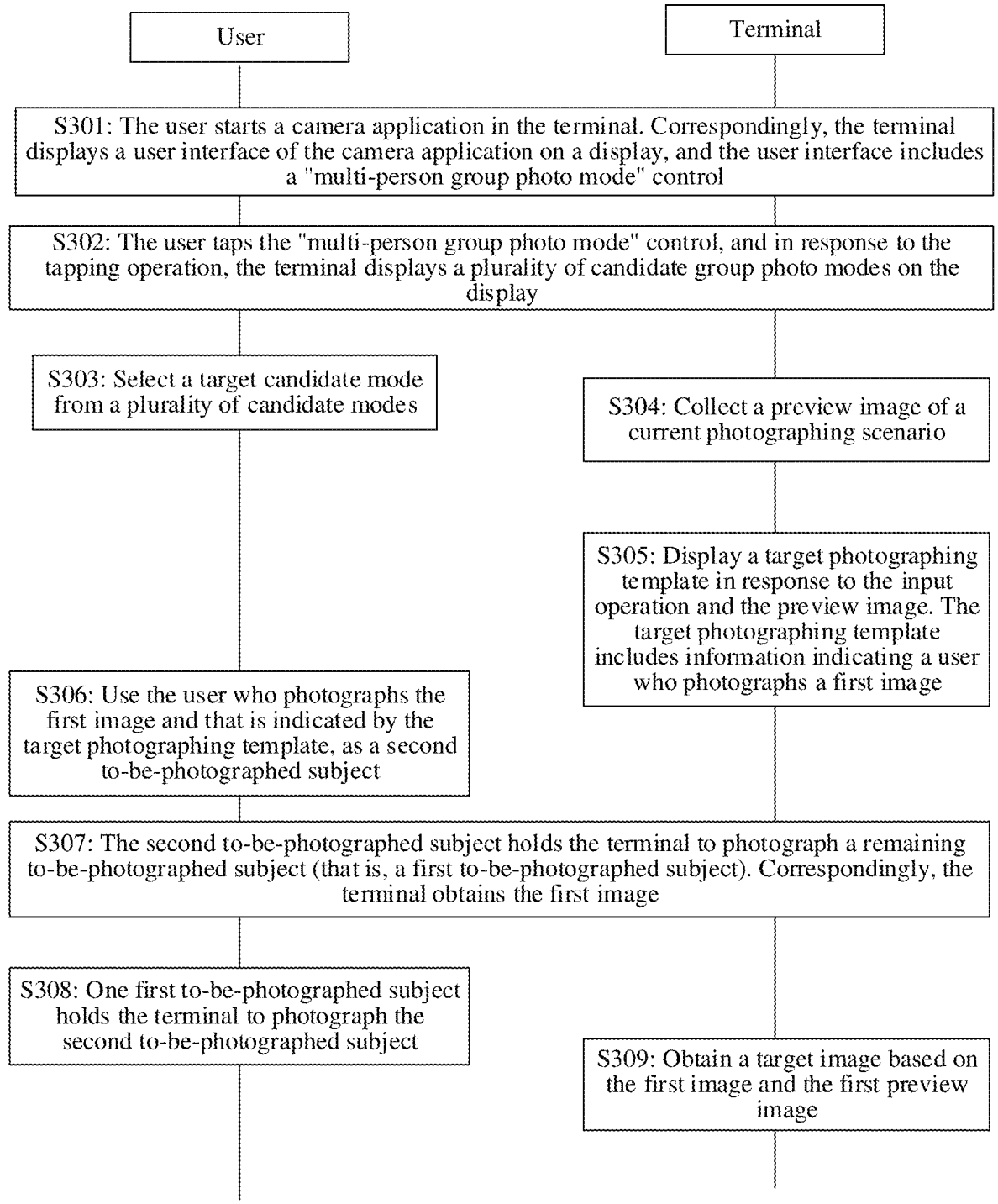
FIG. 18 is a method flowchart of an application example of a technical solution according to an embodiment of the present disclosure.

FIG. 18 is a method flowchart of an application example of a technical solution according to an embodiment of the present disclosure. The method may include the following steps.

S301: A user starts a camera application in a terminal. Correspondingly, the terminal displays a user interface of the camera application on a display, and the user interface includes a "multi-person group photo mode" control.

S302: The user taps the "multi-person group photo mode" control, and in response to the tapping operation, the terminal displays a plurality of candidate group photo modes, such as a couple group photo mode, a bestie group photo mode, a friend group photo mode, a family group photo mode, and a big group photo mode, on the display. Optionally, the user interface may further display an input box of a quantity of people to take a group photo. The user may input the quantity of persons to take a group photo in the input box for the terminal to use when recommending a target photographing template.

S303: The user selects a target candidate mode from a plurality of candidate modes.

S304: The terminal collects a preview image of a current photographing scenario.

S305: The terminal displays the target photographing template in response to the input operation and the preview image. The target photographing template includes information indicating a user who photographs a first image. The target photographing template is a photographing template corresponding to the current photographing scenario, a quantity of portraits in the target photographing template is the same as a quantity of persons to take a group photo, and there is a correspondence between the target photographing template and "a character relationship between multiple people to take a group photo".

Figure 19:
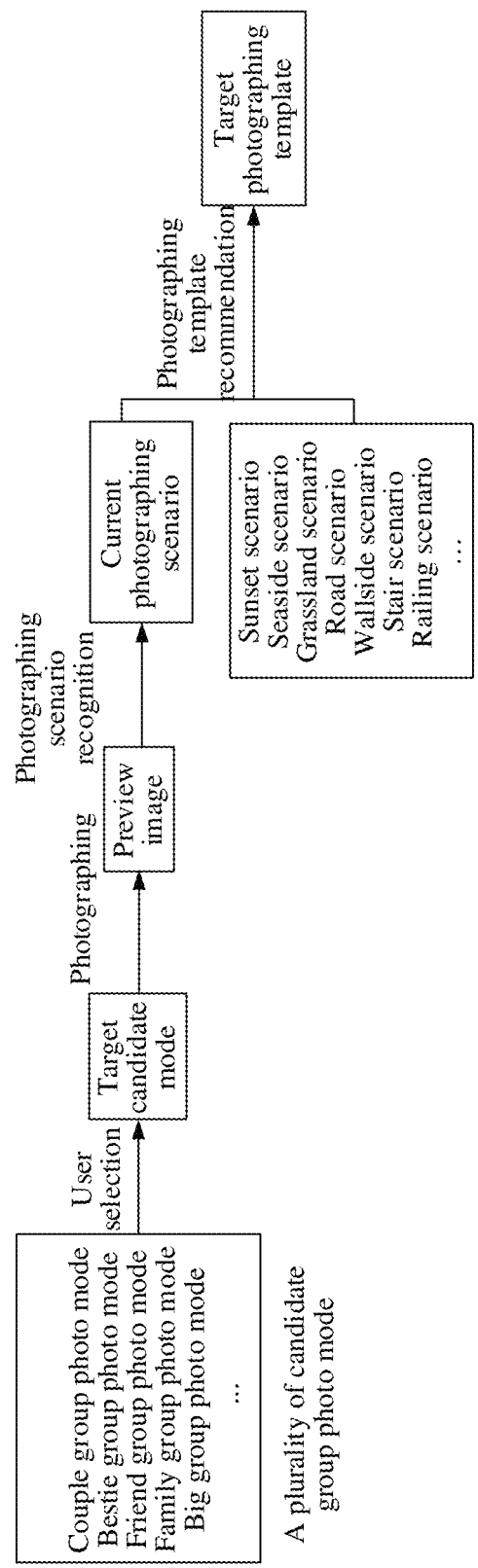
FIG. 19 is a schematic diagram of a process of determining a target photographing template according to an embodiment of the present disclosure.

FIG. 19 is a schematic diagram of a process of steps S301 to S305.

S306: The user uses the user who photographs the first image, and that is indicated by the target photographing template, as a second to-be-photographed subject.

S307: The second to-be-photographed subject holds the terminal to photograph a remaining to-be-photographed subject (that is, a first to-be-photographed subject). Correspondingly, the terminal obtains the first image. For descriptions of a related process in which the terminal obtains the first image, refer to the foregoing descriptions.

S308: One first to-be-photographed subject holds the terminal to photograph the second to-be-photographed subject. Correspondingly, the terminal obtains a first preview image. For a related process in which the terminal obtains the first preview image, refer to the foregoing descriptions.

S309: The terminal obtains a target image based on the first image and the first preview image. For a specific implementation process, refer to the foregoing descriptions.

The foregoing mainly describes the solutions provided in embodiments of the present disclosure from the perspective of the methods. To implement the foregoing functions, corresponding hardware structures and/or software modules for performing the functions are included. A person skilled in the art should easily be aware that, in combination with units and algorithm steps of the examples described in embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In embodiments of the present disclosure, the terminal may be divided into functional modules based on the foregoing method examples. For example, functional modules may be obtained through division based on functions, or two or more functions may be integrated into one processing module. The integrated module may be implemented in a form of hardware, or may be implemented in a form of a software functional module. It should be noted that, in embodiments of the present disclosure, module division is an example, and is merely a logical function division. In actual implementation, another division manner may be used.

Figure 20:
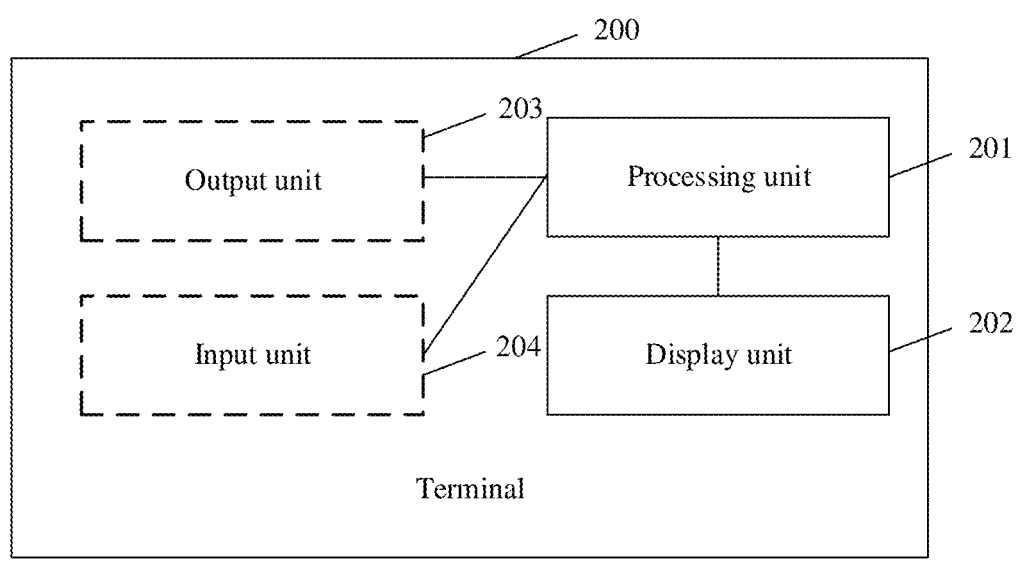
FIG. 20 is a schematic diagram of a structure of a terminal according to an embodiment of the present disclosure.

FIG. 20 is a schematic diagram of a structure of a terminal according to an embodiment of the present disclosure. A terminal 200 shown in FIG. 20 may be configured to implement functions of the terminal in the foregoing method embodiments, and therefore can also achieve the beneficial effects of the foregoing method embodiments. In this embodiment, the terminal may be the terminal 100 shown in FIG. 1.

The terminal 200 includes a processing unit 201 and a display unit 202. The terminal 200 is configured to photograph a plurality of to-be-photographed subjects, and the plurality of to-be-photographed subjects include a first to-be-photographed subject and a second to-be-photographed subject. The processing unit 201 is configured to obtain a first image, where the first image includes an image of a first photographing background and an image of the first to-be-photographed subject. The display unit 202 is configured to display a first preview interface, where the first preview interface includes a first preview image, the first preview image includes an image of a second photographing background and an image of the second to-be-photographed subject, and a degree of coincidence between the image of the second photographing background and the image of the first photographing background is greater than or equal to a preset degree of coincidence. The processing unit 201 is further configured to obtain a target image based on the first image and the first preview image, where the target image includes the image of the first to-be-photographed subject and the image of the second to-be-photographed subject. For example, with reference to FIG. 3, the processing unit 201 may be configured to perform S101 and S104, and the display unit 202 may be configured to perform S102.

Optionally, the display unit 202 is further configured to display a second preview interface before the first preview interface is displayed, where the second preview interface includes a second preview image and first information, the second preview image includes an image of a third photographing background and the image of the second to-be-photographed subject, and the first information indicates adjusting an image of a photographing background in a current preview image of the terminal. For example, with reference to FIG. 10, the display unit 202 may be configured to perform S202.

Optionally, the first information specifically indicates at least one of the following: a degree of coincidence between the image of the third photographing background and the image of the first photographing background is less than the preset degree of coincidence: or a target position of the terminal.

Optionally, the first preview interface further includes second information, where the second information indicates at least one of a position, a pose, or a size of the image of the first to-be-photographed subject in the image of the second photographing background.

Optionally, the second information specifically includes a contour of the image of the first to-be-photographed subject or a translucent image of the image of the first to-be-photographed subject.

Optionally, the terminal 200 further includes an output unit 203, configured to output third information, where the third information indicates that the second to-be-photographed subject is a user who photographs the first image. The output unit 203 may be the display unit 202, or may be another output unit such as an audio output unit. The display unit 202 is further configured to display a third preview image after the output unit 203 outputs the third information, where the third preview image includes the image of the first photographing background and the image of the first to-be-photographed subject. The processing unit 201 is specifically configured to determine the third preview image as the first image, or determine, as the first image, an image obtained by processing the third preview image. For example, with reference to FIG. 12, the output unit 203 may be configured to perform S101a, and the display unit 202 may be configured to perform S101b.

Optionally, the output unit 203 is specifically configured to display a target photographing template, where the target photographing template indicates the third information and a position relationship between the plurality of to-be-photographed subjects. In this case, the output unit 203 is the display unit 202.

Optionally, the display unit 202 is further configured to display a target photographing template, where the target photographing template indicates a position relationship between the plurality of to-be-photographed subjects. The output unit 203 is specifically configured to output the third information based on the target photographing template.

Optionally, the terminal 200 further includes an input unit 204, configured to receive a first operation, where the first operation is used to select a user in the target photographing template who photographs the first image. The input unit 204 may be the display unit 202, or may be another input unit such as an audio input unit. The output unit 203 is specifically configured to output the third information in response to the first operation.

Optionally, the target photographing template further indicates poses of the plurality of to-be-photographed subjects.

Optionally, the user who photographs the first image is a to-be-photographed subject whose range of coincidence with another to-be-photographed subject is less than or equal to a preset range of coincidence in the plurality of to-be-photographed subjects.

Optionally, the user who photographs the first image is a to-be-photographed subject closest to the terminal in the plurality of to-be-photographed subjects.

Optionally, the user who photographs the first image is a to-be-photographed subject whose distance from another to-be-photographed subject is greater than a preset distance in the plurality of to-be-photographed subjects.

Optionally, the processing unit 201 is specifically configured to perform image segmentation on the first image based on the image of the second photographing background to obtain the image of the first to-be-photographed subject, and obtain the target image based on the image of the first to-be-photographed subject and the first preview image.

Optionally, the processing unit 201 is specifically configured to perform image segmentation on the first preview image based on the image of the first photographing background to obtain the image of the second to-be-photographed subject, and obtain the target image based on the image of the second to-be-photographed subject and the first preview image.

For specific descriptions of the foregoing optional manners, refer to the foregoing method embodiments. In addition, for explanations of any terminal 200 provided above and descriptions of beneficial effects, refer to the foregoing corresponding method embodiments.

For example, with reference to FIG. 1, a function of the display unit 202 may be implemented by using the display 194. All functions of the foregoing processing unit 201 may be implemented by the processor 110 by invoking degree code in the internal memory 121. The output unit 203 may be implemented by using a device configured to output information, such as a display 194 or the speaker 170A. The input unit 204 may be implemented by using a device configured to input information, such as the display or the microphone 170C.

Another embodiment of the present disclosure further provides a terminal, including a processor, a memory, and a display, where the display is configured to display an image, the memory is configured to store a computer program and an instruction, and the processor is configured to invoke the computer program and the instruction, to perform, in collaboration with the display, corresponding steps performed by the terminal in the method procedure shown in the foregoing method embodiments.

Another embodiment of the present disclosure further provides a computer-readable storage medium. The computer-readable storage medium stores an instruction. When the instruction is run on a terminal, the steps performed by the terminal in the method procedure shown in the foregoing method embodiments are performed.

In some embodiments, the disclosed methods may be implemented as a computer program instruction encoded in a machine-readable format on a computer-readable storage medium or encoded on another non-transitory medium or product.

It should be understood that the arrangement described herein is merely used as an example. Thus, a person skilled in the art appreciates that another arrangement and another element (for example, a machine, an interface, a function, a sequence, and an array of functions) can be used to replace the arrangement, and some elements may be omitted together depending on a desired result. In addition, many of the described elements are functional entities that can be implemented as discrete or distributed components, or implemented in any suitable combination at any suitable position in combination with another component.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedure or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A photographing method, applied to a terminal, wherein the terminal is configured to photograph a plurality of to-be-photographed subjects including a first to-be-photographed subject and a second to-be-photographed subject, and the method comprises:
   obtaining a first image including an image of a first photographing background and an image of the first to-be-photographed subject;
   displaying a first preview interface including a first preview image, wherein the first preview image comprises an image of a second photographing background and an image of the second to-be-photographed subject, and a degree of coincidence between the image of the second photographing background and the image of the first photographing background is greater than or equal to a threshold degree of coincidence; and
   obtaining a target image based on the first image and the first preview image, wherein the target image comprises the image of the first to-be-photographed subject and the image of the second to-be-photographed subject.

2. The method according to claim 1, wherein before the displaying a first preview interface, the method further comprises:
   displaying a second preview interface, wherein the second preview interface comprises a second preview image and first information, the second preview image comprises an image of a third photographing background and the image of the second to-be-photographed subject, and the first information indicates adjusting an image of a photographing background in a current preview image of the terminal.

3. The method according to claim 2, wherein the first information indicates at least one of the following:
   a degree of coincidence between the image of the third photographing background and the image of the first photographing background is less than the threshold degree of coincidence; or
   a target position of the terminal.

4. The method according to claim 1, wherein the first preview interface further comprises:
   second information, wherein the second information indicates at least one of a position, a pose, or a size of the image of the first to-be-photographed subject in the image of the second photographing background.

5. The method according to claim 4, wherein the second information comprises:
   a contour of the image of the first to-be-photographed subject; or
   a translucent image of the image of the first to-be-photographed subject.

6. The method according to claim 1, wherein the obtaining a first image comprises:
   outputting third information indicating that the second to-be-photographed subject is a user who photographs the first image;
   displaying a third preview image after outputting the third information, wherein the third preview image comprises the image of the first photographing background and the image of the first to-be-photographed subject; and
   determining the third preview image as the first image, or determining, as the first image, an image obtained by processing the third preview image.

7. The method according to claim 6, wherein the outputting third information comprises:
   displaying a target photographing template indicating the third information and a position relationship between the plurality of to-be-photographed subjects.

8. The method according to claim 6, further comprising:
   displaying a target photographing template indicating a position relationship between the plurality of to-be-photographed subjects; and
   the outputting third information comprises:
   outputting the third information based on the target photographing template.

9. The method according to claim 1, wherein
   a user who photographs the first image is a to-be-photographed subject, in the plurality of to-be-photographed subjects, whose range of coincidence with another to-be-photographed subject is less than or equal to a threshold range of coincidence;
   a user who photographs the first image is a to-be-photographed subject closest to the terminal in the plurality of to-be-photographed subjects; or
   a user who photographs the first image is a to-be-photographed subject, in the plurality of to-be-photographed subjects, whose distance from another to-be-photographed subject is greater than a distance threshold.

10. The method according to claim 1, wherein the obtaining a target image based on the first image and the first preview image comprises:
    performing image segmentation on the first image based on the image of the second photographing background to obtain the image of the first to-be-photographed subject, and obtaining the target image based on the image of the first to-be-photographed subject and the first preview image; or
    performing image segmentation on the first preview image based on the image of the first photographing background to obtain the image of the second to-be-photographed subject, and obtaining the target image based on the image of the second to-be-photographed subject and the first preview image.

11. A terminal, configured to photograph a plurality of to-be-photographed subjects including a first to-be-photographed subject and a second to-be-photographed subject, and the terminal comprises:
    at least one processor, configured to obtain a first image including an image of a first photographing background and an image of the first to-be-photographed subject; and
    a display, configured to display a first preview interface including a first preview image, wherein the first preview image comprises an image of a second photographing background and an image of the second to-be-photographed subject, and a degree of coincidence between the image of the second photographing background and the image of the first photographing background is greater than or equal to a threshold degree of coincidence; and
    the at least one processor is further configured to obtain a target image based on the first image and the first preview image, wherein the target image comprises the image of the first to-be-photographed subject and the image of the second to-be-photographed subject.

12. The terminal according to claim 11, wherein
    the display is further configured to display a second preview interface before the first preview interface is displayed, the second preview interface comprises a second preview image and first information, the second preview image comprises an image of a third photographing background and the image of the second to-be-photographed subject, and the first information indicates adjusting an image of a photographing background in a current preview image of the terminal.

13. The terminal according to claim 12, wherein the first information indicates at least one of the following:
    a degree of coincidence between the image of the third photographing background and the image of the first photographing background is less than the threshold degree of coincidence; or
    a target position of the terminal.

14. The terminal according to claim 11, wherein the first preview interface further comprises:
    second information indicating at least one of a position, a pose, or a size of the image of the first to-be-photographed subject in the image of the second photographing background.

15. The terminal according to claim 14, wherein the second information comprises:
    a contour of the image of the first to-be-photographed subject; or
    a translucent image of the image of the first to-be-photographed subject.

16. The terminal according to claim 11, wherein the terminal further comprises:
    an outputter, configured to output third information indicating that the second to-be-photographed subject is a user who photographs the first image; and
    the display is further configured to display a third preview image after the output outputs the third information, wherein the third preview image comprises the image of the first photographing background and the image of the first to-be-photographed subject,
    the third preview image is determined as the first image, or an image obtained by processing the third preview image is determined as the first image.

17. The terminal according to claim 16, wherein
    the display is further configured to display a target photographing template indicating a position relationship between the plurality of to-be-photographed subjects; and
    the third information is output based on the target photographing template.

18. The terminal according to claim 11, wherein
    a user who photographs the first image is a to-be-photographed subject, in the plurality of to-be-photographed subjects, whose range of coincidence with another to-be-photographed subject is less than or equal to a threshold range of coincidence;
    a user who photographs the first image is a to-be-photographed subject closest to the terminal in the plurality of to-be-photographed subjects; or
    a user who photographs the first image is a to-be-photographed subject, in the plurality of to-be-photographed subjects, whose distance from another to-be-photographed subject is greater than a threshold distance.

19. The terminal according to claim 11, wherein the obtaining of the target image based on the first image and the first preview image comprises:
    performing image segmentation on the first image based on the image of the second photographing background to obtain the image of the first to-be-photographed subject, and obtaining the target image based on the image of the first to-be-photographed subject and the first preview image; or
    performing image segmentation on the first preview image based on the image of the first photographing background to obtain the image of the second to-be-photographed subject, and obtaining the target image based on the image of the second to-be-photographed subject and the first preview image.

20. A terminal, comprising at least one processor, at least one memory, and a display, wherein the display is configured to display an image, the at least one memory is configured to store a computer program, including instructions that, when executed by the at least one processor, cause the terminal to perform operations comprising:
    obtaining a first image including an image of a first photographing background and an image of a first to-be-photographed subject;
    displaying a first preview interface including a first preview image, wherein the first preview image comprises an image of a second photographing background and an image of a second to-be-photographed subject, and a degree of coincidence between the image of the second photographing background and the image of the first photographing background is greater than or equal to a threshold degree of coincidence; and
    obtaining a target image based on the first image and the first preview image, wherein the target image comprises the image of the first to-be-photographed subject and the image of the second to-be-photographed subject.

* * * * *